United States Patent Office 3,634,405
Patented Jan. 11, 1972

3,634,405
SYNTHETIC PENICILLINS
Charles Truman Holdrege, Camillus, N.Y., assignor to
Bristol-Myers Company, New York, N.Y.
No Drawing. Filed Aug. 1, 1969, Ser. No. 846,969
The portion of the term of the patent subsequent to
May 18, 1988, has been disclaimed
Int. Cl. C07d 99/16
U.S. Cl. 260—239.1          45 Claims

ABSTRACT OF THE DISCLOSURE

6-[α-(3-imidoylureido)arylacetamide]penicillanic acids and their salts are valuable as antibacterial agents, nutritional supplements in animal feeds, therapeutic agents in poultry and animals, including man, and are especially useful in the treatment of infectious diseases caused by Gram-positive and Gram-negative bacteria, most particularly those caused by the Pseudomonas genus. 6-[D-α-(3-benzimidoylureido)phenylacetamido]penicillanic acid, a preferred embodiment of the invention, is prepared by Raney nickel hydrogenation (50 p.s.i., R.T.) of an aqueous solution of sodium 6-[D-α-(3-phenyl-1,2,4-oxadiazole-5 - yl - amino) - phenylacetamido]penicillanate which is prepared in turn by reaction of sodium ampicillin with 5-chloro-3-phenyl-1,2,4-oxadiazole.

BACKGROUND OF THE INVENTION

(1) Field of the invention

The penicillins of the present invention posses the usual attributes of such compounds and are particularly useful in the treatment of Pseudomonas infections.

(2) Description of the prior art

Heretofore very few penicillins have been found to possess any significant activity against Pseudomonas. The compounds of the present invention exhibit this desirable activity at significantly low concentrations.

α-Aminobenzylpenicillins and α-aminothenylpencillins are known, as from U.S. Pats. 2,985,648, 3,140,282, 3,373,156, 3,308,023 and 3,342,677 and British Pats. 903,785, 918,169, 878,178, 991,586 and 1,033,257 and for such compounds bearing substitutents on the α-amino group from U.S. Pat. 3,381,001 and from such British Patents as 891,777, 894,457, 1,040,166, 1,048,907, 1,051,675, 1,053,415, 1,053,818, 1,057,697, 1,064,893, 1,066,107, 1,080,247, 1,125,339, 1,130,445, 1,134,237 and 1,138,745 and from South Africa 67/2092. N-Substituted 6-ureidopenicillanic acids have been disclosed, for example, in U.S. Pats. 3,188,877, 3,120,512 and 3,180,863 and in Belgian Pat. 603,703 and German Pat. 1,120,072; 6-ureidopenicillanic acid itself is disclosed in German Pats. 1,141,640 and 1,120,072 and French Pat. 1,325,918. A few substituted α-ureidomethylpenicillins are disclosed in U.S. Pat. 3,352,851 and British Pat. 1,040,166; none have a substituent in the 3-position of the ureido group. British Pat. 1,061,335 discloses 6-(D-α-hydrazinocarbonylamino - α-phenylacetamido)penicillanic acid and 6-(D-α-benzyloxycarbonylhydrazinocarbonylamino-α-phenylacetamido)penicillanic acid and, in general, other so-called acyl groups in place of the benzyloxycarbonyl group.

A variety of α-guanidino-arylmethylpencillins are disclosed in U.S. Pat. 3,406,185.

Ring-substituted α-aminobenzylpenicillins have also been reported by Ekstrom et al., Acta Chemica Scandinavica 19 (2), 281–299 (1965) and in U.S. Pats. 3,316,247 and 3,385,847 and can also be made by standard methods from the 2-phenylglycines reported by A. H. Neims et al., Biochemistry (Wash.) 5 (1), 203–213 (January 1966) and by P. Friis et al., Acta Chemica Scandinavica 17 (9), 2391–2396 (1963).

Substituted DL 2-phenylglycines are prepared by alkaline hydrolysis of the appropriate 5-arylhydantoins which in turn are prepared from substituted benzaldehydes by the method of Bucherer and Leib, J. Prakt. Chem., 141, 5 (1934); for additional examples of this procedure see also U.S. Pat. 3,140,282. The substituted DL 2-phenylglycines are resolved, if desired, via their N-formyl derivatives as described by E. Fisher et al., Ber. 41, 1286 (1908) or by one of the procedures illustrated below.

Additional information is given concerning the synthesis of ring-substituted 2-phenylglycines by Doyle et al., J. Chem. Soc., 1440 (1962) and Ryan et al., J. Med. Chem., 12, 310–313 (1969). As stated by Ryan et al. such amino acids are converted into N-t-butoxycarbonyl derivatives by the method of Schwyzer et al., Helv. Chim. Acta. 42, 2622 (1959); Ryan et al. also gives an illustrative example of the resolution of such a derivative by the use of cinchonine.

SUMMARY OF THE INVENTION

Compounds, preferably of the D configuration, having the formulae

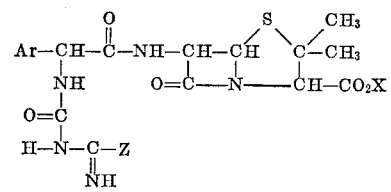

and

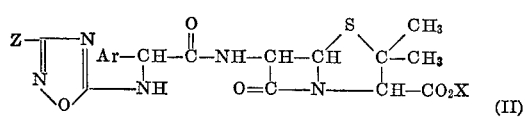

wherein Ar is 2-thienyl, 3-thienyl or

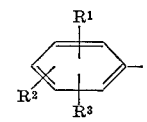

$R^1$, $R^2$ and $R^3$ each is hydrogen, nitro, (lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; Z is (lower)alkyl, cycloalkyl having 4, 5, 6 or 7 carbon atoms, monohalo (lower)alkyl, dichloromethyl, trichloromethyl, (lower)alkenyl of 2 to 6 carbon atoms,

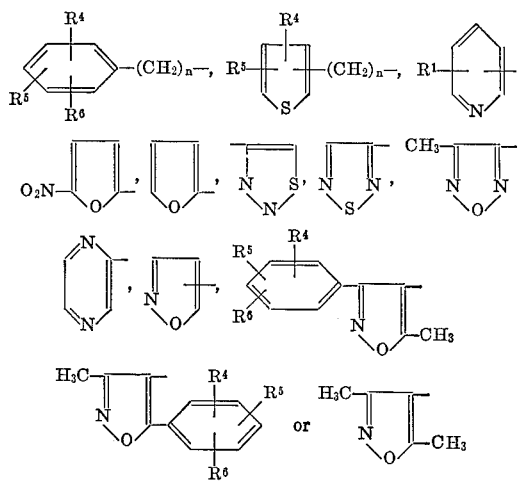

wherein n is an integer from 0 to 3 inclusive and R⁴, R⁵ and R⁶ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; X is hydrogen or a nontoxic, pharmaceutically acceptable metallic cation such as sodium, potassium calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-beta-phenethylamine, 1-ephenamine, N,N'-dibenzylethylenediamine, dehydroabiethylamine, N,N' - bis - dehydroabietylethylenediamine, N-(lower)alkylpiperidine, e.g., N-ethylpiperidine, or other such amines which have been used to form pharmaceutically acceptable nontoxic salts with benzylpenicillin. Such salts are preferably made by treatment of the free acid (zwitterion) form of the product with a strong base.

In the preferred embodiments of this invention, Ar is 2-thienyl, 3-thienyl, or phenyl in which R¹, R² and R³ are each hydrogen, hydroxy or amino (and preferably R² and R³ are hydrogen); X is hydrogen (that is, the compounds exist in the zwitterion form); the α-carbon of the penicillin side chain (to which the substituted amino group is attached) is of the D configuration; and Z is phenyl, thienyl, furyl or (lower)alkyl and, preferably, phenyl, 2-thienyl, 3-thienyl, 2-furyl or methyl.

DETAILED DESCRIPTION

Antibacterial agents such as ampicillin (U.S. 2,985,648) have proved highly effective in the past in the therapy of infections due to Gram-positive and Gram-negative bacteria but these compounds have been notably lacking in their ability to effectively control Pheudomonas infections. Carbenicillin ("PYOPEN") (U.S. 3,142,673 and 3,282,926) is active against Pseudomonas only in high concentrations and is useful in such infections in man only when given by injection.

It was an object of the present invention to provide compounds useful in the treatment of infections caused by Gram-positive and Gram-negative bacteria, including particularly those caused by *Pseudomonas aeruginosa*.

The compounds of the present invention as defined above under "Summary of the Invention" are particularly useful in that they possess antibacterial activity against both Gram-positive and Gram-negative bacteria, and most particularly exhibit activity against *Pseudomonas aeruginosa* infections.

The α-carbon atom of the penicillin side chain (to which the substituted amino group is attached) is an asymmetric carbon atom and the compounds of this invention can therefore exist in two optically active isomeric forms [the D- and L-diastereoisomers], as well as in the DL form which is a mixture of the two optically active forms; all such isomeric forms of the compounds are included within the scope of the present invention but the D form is preferred. Also included within the scope of the present invention are easily hydrolyzed esters which are converted to the free acid form by chemical or enzymatic hydrolysis, as illustrated in Belgian Pat. 684,288 and in U.S. Pat. 3,399,207.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

The pencillins of the present invention containing the α - (3 - substituted - 1,2,4 - oxadiazol-5-yl-amino) group are primarily useful as intermediates for the preparation of the corresponding penicillins containing the α-(3-substituted-imidoylureido) group. The latter are far more potent antibacterial agents.

In the treatment of bacterial infections in man, the penicillins of this invention containing the α-(3-substituted-imidoylureido) group are administered topically, orally and parenterally in accordance with conventional procedures for antibiotic administration in an amount of from about 5 to 125 mg./kg./day and preferably in the range of 15 to 50 mg./kg./day for Pseudomonas infections in divided dosages, e.g., three or four times a day. They are administered in dosage units containing, for example, 125, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The compound of the present invention are also useful for decontamination of filling machines and containers used for cosmetics and topical drugs to prevent or at least reduce the very common contamination of such products with *Pseudomonas aeruginosa*. In such instance, use is made of an aqueous solution having a concentration of at least 1 mgm./ml. and a contact time of at least one hour.

The compounds of Formula II above are prepared by the process which comprises reacting a penicillin of the formula

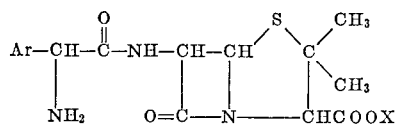

with an oxadiazole of the formula

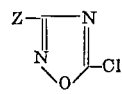

wherein Ar, X and Z have the meaning set out above. The reaction is preferably conducted using about equimolar quantities of the two reagents and X is preferably sodium or potassium in the presence of a base, preferably an inorganic base such as sodium hydroxide or sodium carbonate or an organic base such as a pyridine, N-methylpiperidine, tri(lower)alkylamine, or the like, and preferably in a solvent such as water, dioxane, dimethylformamide, dimethylsulfoxide, chloroform, tetrahydrofuran, n-pentane, methylene chloride, but preferably water, while preferably maintaining the pH above 6 and preferably in the range of pH 8.5–9.0 at a temperature in the range of about —20° C. to 50° C., but preferably about 0° C. to 20 C., and preferably with agitation.

The compounds of Formula II above are converted into those of Formula I by hydrogenation and preferably by hydrogenation at about room temperature over Raney nickel catalyst of an aqueous solution of a salt of the compound of Formula II and preferably a sodium or potassium salt. The hydrogen pressure is preferably about 50 p.s.i. or higher.

Illustrative examples of the preparation of penicillins of the present invention follow. In the title of each example the moiety

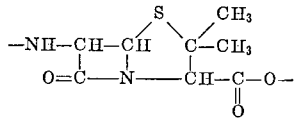

is represented simply by "—APA—."

These examples are given in illustration of, but not in limitation of, the present invention. All temperatures are in degrees centigrade. "Skellysolve B" is a petroleum ether fraction of B.P. 60–68 C. consisting essentially of n-hexane.

DESCRIPTION OF THE PREFERRED EMBODIMENTS

Example 1

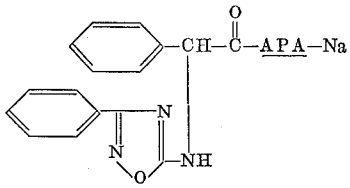

5-hydroxy-3-phenyl-1,2,4-oxadiazole.—A solution of 103.1 g. (1 mole) of benzonitrile in 400 ml. of 95% ethanol was added to a mixture of 53 g. (0.5 mole) of sodium carbonate, 69.5 g. (1 mole) of hydroxylamine hydrochloride, 200 ml. of water and 300 ml. of 95% ethanol. The mixture was refluxed for 18 hours. Most of the ethanol was distilled off and additional water was added. The product, which crystallized on cooling, was filtered, washed with water, and air dried. The product was dissolved in benzene and the benzene distilled off to remove any remaining water leaving a crystalline residue of benzamide oxime (lit. ref. Beil. 9, 304, II 214).

Ethyl chloroformate (47.4 ml., 0.5 mole) was added in a rapid stream to a warm solution of the benzamide oxime in 250 ml. of benzene. The mixture was refluxed for 10 minutes, cooled slightly and 500 ml. of water added. The benzene was distilled off and the remaining aqueous mixture was refluxed for 2.5 hours giving a one phase solution. After cooling, the crystalline 5-hydroxy-3-phenyl-1,2,4-oxadiazole was collected by filtration, washed with a small amount of water and purified by dissolving in dilute aqueous sodium hydroxide and acidifying with acetic acid; yield 22 g., M.P. 198–201° (lit. ref. Beil. 27, 644, II 698).

5-chloro-3-phenyl-1,2,4-oxadiazole.—A mixture of 22 g. of 5-hydroxy-3-phenyl-1,2,4-oxadiazole, 55.8 ml. of phosphorus oxychloride and 5 ml. of pyridine was refluxed for 17.5 hours. The excess phosphorus oxychloride was removed at reduced pressure. Water and ice was added to the residue and the mixture was extracted with ether. The ether phase was dried with sodium sulfate and the solvent distilled off. Benzene was added to the residue and this was distilled off to remove any remaining water. Vacuum distillation of the residue afforded 17.3 g., B.P. 112° (3 mm.) of 5-chloro-3-phenyl-1,2,4-oxadiazole (lit. ref. C. A. 65, P 732).

Sodium 6-[D-α-(3-phenyl-1,2,4-oxadiazol-5-yl-amino)-phenylacetamido]penicillanate.—A solution of ampicillin sodium salt in water was prepared by adjusting a suspension of 18.5 g. (0.0458 mole) of ampicillin trihydrate in 100 ml. of water to pH 9.0 with aqueous sodium carbonate (4.9 g. of sodium carbonate dissolved in 50 ml. of water). To the solution was added 100 ml. of dioxane and 8.3 g. (0.0458 mole) of 5-chloro-3-phenyl-1,2,4-oxadiazole. The reaction mixture was stirred rapidly for two hours at room temperature while aqueous sodium carbonate (4.9 g. of sodium carbonate dissolved in 50 ml. of water) was added dropwise as needed to maintain the system at pH 8.5–9.0. The solution was adjusted to pH 7.5 and 6 N hydrochloric acid and most of the dioxane was stripped off at reduced pressure. The aqueous concentrate was adjusted to pH 7.0 and extracted with ethyl acetate and ethyl acetate extract was discarded. The aqueous phase was adjusted to pH 2.5 and extracted three times with ethyl acetate. The combined ethyl acetate extracts were washed three times with water, dried with sodium sulfate, filtered, concentrated somewhat to remove water, some fresh ethyl acetate added, and treated with 16.3 ml. (0.0458 mole) of sodium 2-ethylhexanoate in 1-butanol. Crystallization was allowed to proceed in the cold overnight. The product, sodium 6-[D-α-(3-phenyl - 1,2,4 - oxadiazol-5-yl-amino)phenylacetamido] penicillanate, was collected by filtration, washed with several portions of ethyl acetate and air dried; yield 15.2 g. Part (5 g.) of the product was removed for the subsequent reductive ring opening experiment and the remainder was dried in vacuo for 3 hours at 60°; yield 9.8 g., M.P. 228–230° dec. with prior darkening. The infrared and nuclear magnetic resonance spectra were consistent for sodium 6-[D-α-(3-phenyl-1,2,4-oxadiazole-5-amino)-phenylacetamido]penicillanate.

Analysis.—Calcd. for $C_{24}H_{22}N_5O_5SNa \cdot \frac{1}{2}H_2O$ (percent): C, 54.95; H, 4.42; N, 13.35. Found (percent): C, 54.76; H, 4.86; N, 13.3.

Example 2

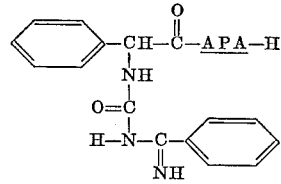

6-[D-α-(3 - benzimidoylureido)phenylacetamido]penicillanic acid.—A solution of 5.0 g. of sodium 6-[D-α-(3-phenyl - 1,2,4 - oxadiazol-5-yl-amino)phenylacetamido] penicillanate in 150 ml. of water was hydrogenated in the presence of commercial Raney nickel catalyst (No. 28) at an initial pressure of 50 p.s.i. in a Paar hydrogenation apparatus at room temperature for 1.3 hours with the theoretical amount of hydrogen being taken up. The catalyst was removed by filtration. The filtrate was slowly adjusted to pH 6.5 with 6 N hydrochloric acid precipitating the product in crystalline form. The filtered product was washed with water and dried in vacuo over phosphorus pentoxide; yield 4.0 g., M.P. 185–186° dec. The infrared and nuclear magnetic resonance spectra were consistent for 6-[D-α-(3-benzimidoylureido)phenylacetamido]penicillanic acid.

Analysis.—Calcd. for $C_{24}H_{25}N_5O_5S$ (percent): C, 58.17; H, 5.08; N, 14.13. Found (percent): C, 57.77; H, 5.35; N, 14.40.

The Minumum Inhibitory Concentration (M.I.C.) of this product in mcg./ml. versus a strain of *Pseudomonas aeruginosa* was determined by overnight incubation at 37° C. in Nutrient Broth by serial two-fold tube dilution and found to be 8 mcg./ml.; in the same experiment the M.I.C. for sodium ampicillin was found to be 63 mcg./ml. and for disodium carbenicillin to be 32 mcg./ml.

Example 3

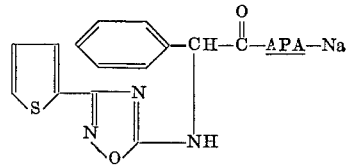

5-hydroxy-3-(2'-thienyl)-1,2,4-oxadiazole.—A mixture of 176.1 g. (1.61 mole) of 2-thienonitrile, 111.9 g. (1.61 mole) of hydroxylamine hydrochloride, 85.3 g. (0.805 mole) of sodium carbonate, 1 liter of 95% ethanol and 300 ml. of water was heated at reflux for 17 hours. A small amount of solid was removed by filtration. Additional water was added to the filtrate and the ethanol was stripped off at reduced pressure causing the crystalline product to separate. The filtered product was washed with water. The crude product was heated with benzene most of it going into solution. Cooling this mixture gave after filtration and drying 170.9 g. of 2-thiophenecarboxamide oxime; M.P. 87–88° (lit. ref. Beil. 18, 290).

Ethyl chloroformate (130.2 g., 1.2 mole) was added gradually to a heated and stirred solution of 170.9 g. (1.2 mole) of 2-thiophenecarboxamide oxime 96.5 ml. of pyridine and 300 ml. of benzene. An exothermic reaction took place which caused the mixture to reflux. The mixture was refluxed for 15 minutes after the addition of ethyl chloroformate was complete. The mixture was cooled slightly and 600 ml. of water was added. The benzene was distilled off and the remaining aqueous mixture was refluxed for 2.5 hours. After cooling overnight the product was filtered and washed with water. The crude product was dissolved in dilute aqueous sodium hydroxide, the solution carbon treated, and reprecipitated by acidification with acetic acid. There was obtained 139.4 g. of 5-hydroxy-3-(2'-thienyl)-1,2,4-oxadiazole; M.P. 185–190° dec. The nuclear magnetic resonance and infrared spectra were consistent for the desired compound.

5-chloro-3-(2'-thienyl)-1,2,4-oxadiazole.—A mixture of 60 g. of 5-hydroxy-3-(2'-thienyl)-1,2,4-oxadiazole, 150 ml. of phosphorus oxychloride and 13.6 ml. of pyridine was refluxed for 16 hours. The excess phosphorus oxychloride was stripped off at reduced pressure. The residue was treated with ice and water and extracted several times with ether. The combined organic extracts were washed with water and dried with sodium sulfate. The ether was distilled off, the residue was vacuum distilled giving 11.1 g., B.P. 70° (1.5 mm.) of 5-chloro-3-(2'-thienyl)-1,2,4-oxadiazole which crystallized M.P. 33–35°.

Sodium 6-{D-α-[3-(2'-thienyl)-1,2,4-oxadiazol-5-ylamino]phenylacetamido}penicillanate.—To a stirred suspension of 23.9 g. (0.059 mole) of ampicillin trihydrate in 130 ml. of water was added aqueous sodium carbonate (6.2 g. of sodium carbonate in 50 ml. of water) to pH 9. To this solution was added 65 ml. of dioxane followed by a solution of 11 g. (0.059 mole) of 5-chloro-3-(2'-thienyl)-1,2,4-oxadiazole in 35 ml. of dioxane. The mixture was stirred for 2 hours at room temperature while aqueous sodium carbonate was added as needed to maintain the mixture at pH 8.5–9.0. The solution was adjusted to pH 7.5 with 6 N hydrochloric acid and the dioxane stripped off at reduced pressure. The aqueous phase was adjusted to pH 7.0, extracted with ethyl acetate (discarded), adjusted to pH 2.5 and extracted three times with ethyl acetate. The combined ethyl acetate extracts were washed three times with water, dried with sodium sulfate, and treated with 20 ml. (0.059 mole) of sodium 2-ethylhexanoate in 1-butanol. The solvent was removed at reduced pressure. Trituration of the residue with anhydrous ether afforded 28.1 g. of sodium 6-{D-α-[3-(2'-thienyl)-1,2,4-oxadiazol-5-yl-amino]phenylacetamido}penicillanate; decomposes above 190° with prior darkening. The infrared and nuclear magnetic resonance spectra were consistent for the desired product.

Analysis.—Calcd. for $C_{22}H_{20}N_5O_5S_2Na \cdot H_2O$ (percent): C, 48.97; H, 4.11; N, 12.98. Found (percent): C, 48.32; H, 4.42; N, 12.62.

Example 4

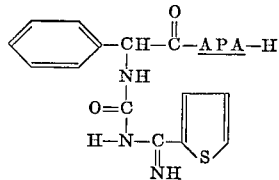

6-{D-α-[3-(2'-thienimidoyl)ureido]phenylacetamido}penicillanic acid.—A solution of 5.0 g. of sodium 6-{D-α-[3-(2'-thienyl)-1,2,4-oxadiazol-5-ylamino]phenylacetamido}penicillanate in 150 ml. of water was hydrogenated in the presence of commercial Raney nickel catalyst on a Paar hydrogenation apparatus at an initial pressure of 50 p.s.i. at room temperature for 1.25 hours. The catalyst was removed by filtration, fresh catalyst was added, and hydrogenation continued for one hour longer. After removal of the catalyst by filtration the filtrate was adjusted to ph 3.0 giving an amorphous precipitate. The product was collected by filtration and washed with water. The filtrate deposited crystalline product on storage in the cold overnight. This was used as seed. The amorphous product was suspended in 60 ml. of water and brought into solution by adjusting to pH 8.5 with aqueous sodium carbonate. The solution was slowly adjusted to pH 3.0 with 6 N hydrochloric acid while seeding with crystalline material. There was obtained after collection by filtration and drying in vacuo over phosphorus pentoxide 3.0 g. of 6{D-α-[3-(2'-thienimidoyl)ureido]phenylacetamido}penicillanic acid; M.P. 169–171° dec. The infrared and nuclear magnetic resonance spectra were consistent for the desired product.

Analysis.—Calcd. for $C_{22}H_{23}N_5O_5S_2 \cdot H_2O$ (percent): C, 50.85; H, 4.85; N, 13.48. Found (percent): C, 50.89; H, 4.99; N, 13.10.

The Minimum Inhibitory Concentration (M.I.C.) of this product in mcg./ml. versus a strain of Pseudomonas aeruginosa was determined by overnight incubation at 37° C. in Nutrient Broth by serial two-fold tube dilution and found to be 8 mcg./ml.; in the same experiment in M.I.C. for sodium ampicillin was found to be 250 mcg./ml.

Example 5

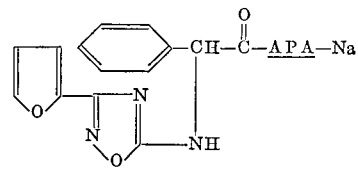

3-(2'-furyl)-5-hydroxy-1,2,4-oxadiazole.—A mixture of 69.5 g. (0.746 mole) of 2-furylnitrile [Ber. 14, 1058 (1881)], 51.8 g. (0.746 mole) of hydroxylamine hydrochloride, 39.5 g. (0.373 mole) of sodium carbonate, 500 ml. of 95% ethanol and 150 ml. of water was refluxed overnight. The mixture was filtered and 150 ml. of water was added. The ethanol was stripped off at reduced pressure. The aqueous phase was extracted several times with ethyl acetate. The combined organic extracts were carbon treated, dried with sodium sulfate and the solvent removed at reduced pressure leaving 88.9 g. of 2-furylamide oxime as a viscous oil (lit. ref. C. A. 52 7292b).

Ethyl chloroformate (76.5 g., 0.705 mole) was added slowly to a heated and stirred solution of 88.9 g. of 2-furylamide oxime, 56.7 ml. (0.705 mole) of pyridine and 200 ml. of benzene. After the addition of ethyl chloroformate was complete the reaction mixture was refluxed an additional 15 minutes. Water (400 ml.) was added and the benzene distilled off. The remaining aqueous mixture was refluxed for 2.5–3 hours. After cooling in an ice bath the solid product was collected by filtration and washed with water. The product was dissolved in dilute aqueous sodium hydroxide solution, carbon treated, the solution acidified with acetic acid with ice cooling and the reprecipitated product filtered and washed carefully with ice water. The product was again purified in the same manner giving after drying in vacuo over phosphorus pentoxide 50.1 g. of 3-(2'-furyl)-5-hydroxy-1,2,4-oxadiazole; dec. above 210°.

Analysis.—Calcd. for $C_6H_4N_2O_3$ (percent): C, 47.37; H, 2.65; N, 18.42. Found (percent): C, 47.27; H, 2.91; N, 18.39.

Sodium 6-{D-α-[3-(2'-furyl)-1,2,4-oxadiazol-5-ylamino]-phenyl-acetamido}penicillanate.—A mixture of 50 g. (0.328 mole) of 3(2'-furyl)-5-hydroxy-1,2,4-oxadiazole, 125 ml. of phosphorus oxychloride and 11.3 ml. of pyridine was refluxed for 16 hours. The excess phosphorus oxychloride was removed at reduced pressure and the residue was poured into about 500 ml. of water and crushed ice. The mixture was extracted three times with ether some insoluble material being filtered off during the first extraction. The combined ether extracts were washed three times with water, dried with sodium sulfate and concentrated at reduced pressure. To the residue was added "Skellysolve B" and some solid (identified as starting material) removed by filtration. The filtrate was stripped of solvent at reduced pressure leaving a solid residue of 5-chloro-3-(2'-furyl)-1,2,4-oxadiazole. This product was used without further purification.

Ampicillin trihydrate (23.9 g., 0.059 mole) in 130 ml. of water was brought into solution at pH 9 with aqueous sodium carbonate (6.2 g. of sodium carbonate in 50 ml. of water). To this solution was added 50 ml. of dioxane and a solution of 9.3 g. of the above obtained chloro compound in 50 ml. of dioxane. The mixture was stirred for two hours at room temperature while being maintained at pH 8.5–9.0 by the addition of aqueous sodium carbonate as needed. The solution was adjusted to pH 7.5 with 6 N hydrochloric acid and the dioxane stripped off at reduced pressure. The aqueous concentrate was adjusted to pH 7.0 and extracted twice with ethyl acetate. The aqueous phase was layered with ethyl acetate and adjusted to pH 2.5 with 6 N hydrochloric acid. The aqueous phase was extracted twice more with ethyl acetate. The combined organic extracts were washed three times with water, dried over sodium sulfate and treated with 20 ml. (1 eqv.) of sodium 2 - ethylhexanoate in 1-butanol. The solvent was stripped off at reduced pressure and the oily residue triturated with anhydrous ether giving a filterable solid. The product, sodium 6-{D-α-[3-(2'-furyl)-1,2,4-oxadiazol - 5-yl-amino]phenylacetamido} penicillanate, was collected by filtration and washed well with anhydrous ether; yield 17.4 g., M.P. 165–175° dec. The infrared and nuclear magnetic resonance spectra were consistent for sodium 6-{D-α-[3-(2'-furyl) - 1,2,4-oxadiazole-5-amino]phenylacetamido}penicillanate, Example 6

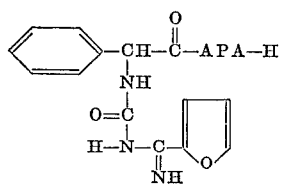

6-{D-α - [3-(2'-furimidoyl)ureido]phenylacetamido} penicillanic acid.—A solution of 5.0 g. of sodium 6-{D-α-(2'-furyl-1,2,4 - oxadiazol-5-yl-amino]phenylacetamido} penicillanate in 150 ml. of water was hydrogenated in the presence of commercial Raney nickel catalyst on a Paar hydrogenation apparatus at an initial pressure of 50 p.s.i. at room temperature for 2 hours. The catalyst was removed by filtration and the filtrate was adjusted to pH 3.0 with 6 N hydrochloric acid. After cooling in an ice bath the product was filtered, washed with water and dried over phosphorus pentoxide; yield 3.0 g., decomposes above 150°. The infrared and nuclear magnetic resonance spectra were consistent with the desired compound.

The Minimum Inhibitory Concentration (M.I.C.) of this product in mcg./ml. versus a strain of *Pseudomonas aeruginosa* was determined by overnight incubation at 37° C. in Nutrient Broth by serial two-fold tube dilution and found to be 16 mcg./ml. in the same experiment the M.I.C. for sodium ampicillin was found to be >250 mcg./ml.

Example 7

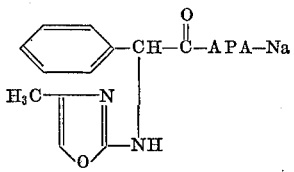

Sodium 6-[D-α-(3 - methyl - 1,2,4 - oxadiazol-5-yl-amino)phenylacetamido]penicillanate.—Ampicillin trihydrate (11.3 g., 0.028 moles) in 60 ml. of water was brought into solution at pH 8.7 by the addition of aqueous sodium carbonate. To this was added 30 ml. of dioxane and a solution of (6.0 g., 0.028 mole) 5-iodo-3-methyl-1,2,4-oxadizale [Moussebois, Eloy, Helv. Chim. Acta, 47, 838–848 (1964)] in 30 ml. of dioxane. The mixture was stirred for 4.5 hours at room temperature while aqueous sodium carbonate was added as needed to maintain pH 8.7–9.0. The reaction mixture was adjusted to pH 7.5 with 6 N hydrochloric acid and most of the dioxane stripped off. The aqueous residue was adjusted to pH 7.0 and extracted twice with ethyl acetate. The aqueous phase was layered with ethyl acetate and adjusted to pH 2.5 with 6 N hydrochloric acid. Two more extractions were made with ethyl acetate. The combined ethyl acetate extracts were washed twice with water, dried with sodium sulfate and treated with 17 ml. (1 eqv.) of sodium 2-ethylhexanoate in 1-butanol. The solvent was stripped off at reduced pressure and the residue was triturated with anhydrous ether giving sodium 6-[D-α-3-methyl-1,2,4 - oxadiazol-5-yl-amino)phenylacetamido] penicillanate as a filterable solid. The product was collected by filtration and washed with anhydrous ether; yield 5.4 g., decomposes above 160°. The infrared and nuclear magnetic resonance spectra were consistent for the desired product.

Example 8

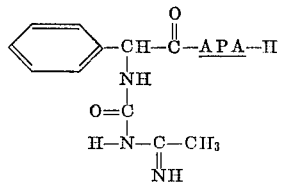

6 - [D-α-(3-acetimidoylureido)phenylacetamido]penicillanic acid.—A solution of 6.6 g. of sodium 6-[D-α-(3-methyl - 1,2,4 - oxadiazol - 5-yl-amino)phenylacetamido] penicillanate in 150 ml. of water was hydrogenated in the presence of commercial Raney nickel catalyst on a Paar hydrogenation apparatus at an initial pressure of 50 p.s.i. at room temperature for 2 hours. The catalyst was removed by filtration. The filtrate was adjusted to pH 4.5 and a small amount of precipitate removed by filtration. The filtrate was readjusted to pH 4.5 and concentrated to a small volume precipitating 2.3 g. (after drying in vacuo over phosphorus pentoxide) of 6 - [D-α-(3-acetimidoylureido)phenylacetamido]penicillanic acid; M.P. 167–170° dec. The infrared and nuclear magnetic resonance spectra were consistent with 6-[D-α(3-acetimidoylureido) phenylacetamido]penicillanic acid.

The Minimum Inhibitory Concentration (M.I.C. of this product in mcg./ml. versus a strain of *Pseudomonas aeruginosa* was determined by overnight incubation at 37° C. in Nutrient Broth by serial two-fold tube dilution and found to be 16 mcg./ml.; in the same experiment the M.I.C. for sodium ampicillin was found to be 250 mcg./ml.

Example 9

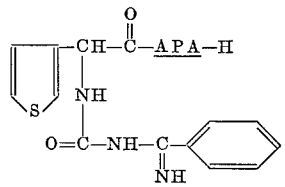

6 - [D-α-(3 - benzimidoylureido)-3-thienylacetamido] penicillanic acid.—This compound is prepared by substituting an equimolar weight of 6-(D-α-amino-3-thienylacetamido)penicillanic acid for the ampicillin trihydrate in the procedure of Examples 1 and 2.

Example 10

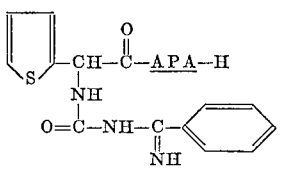

6 - [D-α-(3 - benzimidoylureido)-2-thienylacetamido] penicillanic acid.—This compound is prepared by substituting an equimolar weight of 6-(D-α-amino-2-thienylacetamido)-penicillanic acid for the ampicillin trihydrate in the procedure of Examples 1 and 2.

Example 11

The procedures of Examples 1 and 2 are repeated while replacing the benzonitrile used therein with an equimolar weight of the nitrile prepared by $P_2O_5$ dehydration of each of the corresponding amides having the following structures:

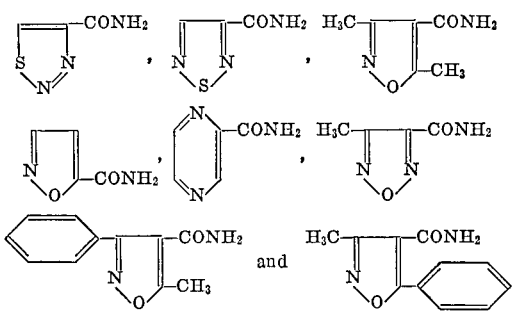

to produce, respectively, the compounds of the formulae

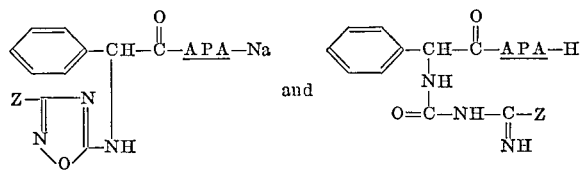

wherein Z is

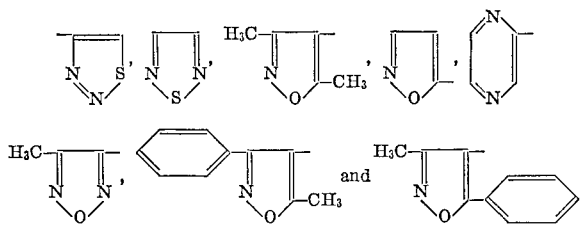

When necessary the amide is prepared by converting the corresponding acid to its acid chloride with thionyl chloride and thence to the amide by treatment of the acid chloride with ammonia in the usual manner.

Example 12

The procedures of Examples 1 and 2 are repeated while replacing the benzonitrile used therein with an equimolar weight of the nitrile of the formula R—CN wherein R is dichloromethyl, trichloromethyl, n-propyl, isopropyl, n-butyl, isobutyl, sec.-butyl, t-butyl, n-pentyl, cyclobutyl, cyclopentyl, cyclohexyl and cycloheptyl, respectively to produce, respectively, the corresponding compounds of the formulae

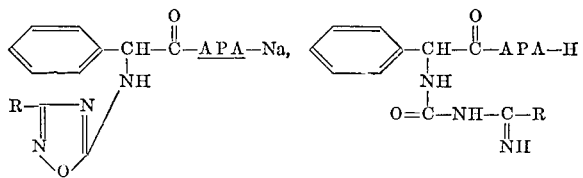

Example 13

By following the procedure used in U.S. Pat. 3,140,282 to convert 2-phenylglycine to 2-phenylglycine chloride hydrochloride and thence to α-aminobenzylpenicillin (ampicillin; 6-α-amino-phenylacetamidopenicillanic acid, the corresponding, ring substituted α-aminobenzylpenicillin is prepared from each of the following amino-acids D-α-amino-m-nitrophenylacetic acid,
D-α-amino-m-aminophenylacetic acid,
DL-α-amino-p-methylphenylacetic acid,
DL-α-amino-m-methylphenylacetic acid,
DL-α-amino-p-chlorophenylacetic acid,
DL-α-amino-m-chlorophenylacetic acid,
DL-α-amino-p-methoxyphenylacetic acid,
DL-α-amino-m-methoxyphenylacetic acid,
DL-α-amino-p-fluorophenylacetic acid,
DL-α-amino-m-fluorophenylacetic acid,
DL-α-amino-p-hydroxyphenylacetic acid,
DL-α-amino-m-hydroxyphenylacetic acid,
DL-α-amino-p-aminophenylacetic acid,
DL-α-amino-m-aminophenylacetic acid,
DL-α-amino-m-nitrophenylacetic acid,
DL-α-amino-p-dimethylaminophenylacetic acid,
DL-α-amino-m,p-dimethoxyphenylacetic acid,
D-α-amino-m-iodophenylacetic acid,
D-α-amino-m-chloro-p-hydroxyphenylacetic acid,
D-α-amino-p-methoxyphenylacetic acid,
D-α-amino-p-hydroxyphenylacetic acid,
D-α-amino-m-methoxyphenylacetic acid,
D-α-amino-m-hydroxyphenylactic acid,
D-α-amino-p-acetamidophenylacetic acid,
D-α-amino-m-aminophenylacetic acid, and
D-α-amino-m-acetamidophenylacetic acid.

Substitution in turn of an equimolar weight of each of the ring-substituted α-aminobenzylpencillins thus produced for the ampicillin trihydrate in the procedures of Examples 1 and 2 above produces, in turn, Sodium 6-[D-α-(3-benzimidoylureido)-m-nitrophenylacetamido]-penicillanic acid,
Sodium 6-[D-α-(3-benzimidoylureido)-m-aminophenylacetamido]-penicillanic acid,
Sodium 6-[DL-α-(3-benzimidoylureido)-p-methylphenylacetamido]-penicillanic acid,
Sodium 6-[DL-α-3-benzimidoylureido)-m-methylphenylacetamido]-penicillanic acid,
Sodium 6-[DL-α-(3-benzimidoylureido)-p-chlorophenylacetamido]-penicillanic acid,
Sodium 6-[DL-α-(3-benzimidoylureido)-m-chlorophenylacetamido]-penicillanic acid,
Sodium 6-[DL-α-(3-benzimidoylureido)-p-methoxyphenylacetamido]-penicillanic acid,
Sodium 6-[DL-α-(3-benzimidoylureido)-m-methoxyphenylacetamido]-penicillanic acid,
Sodium 6-[DL-α-(3-benzimidoylureido)-p-fluorophenylacetamido]-penicillanic acid,
Sodium 6-[DL-α-(3-benzimidoylureido)-m-fluorophenylacetamido]-penicillanic acid,
Sodium 6-[DL-α-(3-benzimidoylureido)-p-hydroxyphenylacetamido]-penicillanic acid,
Sodium 6-[DL-α-(3-benzimidoylureido)-m-hydroxyphenylacetamido]-penicillanic acid,
Sodium 6-[DL-α-(3-benzimidoylureido)-p-aminophenylacetamido]-penicillanic acid,
Sodium 6-[DL-α-(3-benzimidoylureido)-m-aminophenylacetamido]-penicillanic acid,
Sodium 6-[DL-α-(3-benzimidoylureido)-m-nitrophenylacetamido]-penicillanic acid,
Sodium 6-[DL-α-(3-benzimidoylureido)-p-dimethylaminophenylacetamido]-penicillanic acid,
Sodium 6-[DL-α-(3-benzimidoylureido)-m,p-dimethoxyphenylacetamido]-pencillanic acid,
Sodium 6-[D-α-(3-benzimidoylureido)-p-iodophenylacetamido]-penicillanic acid, Sodium 6-[D-α-(3-benzimidoylureido)-m-iodophenyl-
acetamido]penicillanic acid,
Sodium 6-[D-α-(3-benzimidoylureido)-m-chloro-p-
hydroxyphenylacetamido]penicillanic acid,
Sodium 6-[D-α-(3-benzimidoylureido)-p-methoxyphenyl-
acetamido]penicillanic acid,
Sodium 6-[D-α-(3-benzimidoylureido)-p-hydroxyphenyl-
acetamido]penicillanic acid,
Sodium 6-[D-α-(3-benzimidoylureido)-m-methoxyphenyl-
acetamido]penicillanic acid,
Sodium 6-[D-α-(3-benzimidoylureido)-m-hydroxyphenyl-
acetamido]penicillanic acid,
Sodium 6-[D-α-(3-benzimidoylureido)-p-acetamido-
phenylacetamido]-pencillanic acid,
Sodium 6-[D-α-(3-benzimidoylureido)-m-aminophenyl-
acetamido]-penicillanic acid, and
Sodium 6-[D-α-(3-benzimidoylureido)-m-acetamido-
phenylacetamido]-penicillanic acid.

The preparation of each of these α-amino acids is described in either U.S. Patents 3,198,803 and 3,342,677 or by Friis et al., Acta Chem. Scand. 17, 2391–2396 (1966) or by Neims et al., Biochemistry (Wash.) 5, 203–213 (1966) or in the section below entitled Illustrative Preparations of Starting Reagents.

Example 14

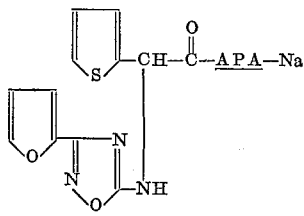

Sodium 6-{D-α-[3-(2′-thienyl)-1,2,4-oxadiazole-5-yl-amino]-2-thienylacetamido}-penicillanate.—A suspension of 15.0 g. (0.037 mole) of 6-(D-α-amino-2-thienylacetamido)-pencillanic acid trihydrate in 130 ml. of water was brought into solution by adding aqueous sodium carbonate (3.9 g. of sodium carbonate in 20 ml. of water) to pH 9.0. Dioxane, 60 ml., was added followed by a solution of 5-chloro-3-(2′-thienyl)-1,2,4-oxadiazole in 40 ml. of dioxane. The mixture was stirred at room temperature for 2 hours while aqueous sodium carbonate (3.9 g. of sodium carbonate in 20 ml. of water) was added as needed to maintain pH 8.5–9.0. The reaction mixture was adjusted to pH 7.5 with 6 N hydrochloric acid and the dioxane stripped off at reduced pressure. The aqueous concentrate was readjusted to pH 7.0 and extracted once with ethyl acetate. The aqueous phase was layered with ethyl acetate and adjusted to pH 2.5 with 6 N hydrochloric acid. Two more extractions with ethyl acetate were made. The combined organic extracts were washed three times with water, dried with sodium sulfate, filtered and treated with 14 ml. (0.037 mole) of sodium 2-ethylhexanoate in 1-butanol. The flask was stored in the cold over a weekend while the product crystallized. The product sodium 6-{D-α-[3-(2′-thienyl)-1,2,4-oxadiazole-5-yl-amino]-2-thienylacetamido}-penicillanate, was collected by filtration, washed well with ethyl acetate, air dried (wt. 14.2 g.) and further dried in a vacuum oven at 60° for 2.5 hours; M.P. 230–237° decomp. The infrared and nuclear magnetic resonance spectra were fully consistent for the desired product.

Example 15

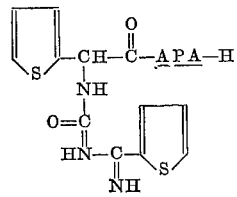

6-{D-α-[3-(2′-thienimidoyl)ureido] - 2 - thienylacet-amido}penicillanic acid.—A solution of 5 g. of sodium 6-{D-α-[3-(2′ - thienyl) - 1,2,4-oxadiazo-5-yl-amino]-2-thienylacetamido}-penicillanate in 200 ml. of water and about 30 ml. of dioxane plus a small amount of sodium carbonate was hydrogenated in the presence of commercial Raney nickel catalyst in a Paar hydrogenation apparatus at an initial pressure of 50 p.s.i. at room temperature for 2 hours. The catalyst was removed by filtration. The filtrate was adjusted to pH 7.3 with 6 N hydrochloric acid. The dioxane was stripped off at reduced pressure. The aqueous concentrate was slowly adjusted to pH 3.0 with 6 N hydrochloric acid precipitating the product. After storing in the cold overnight the crystalline product was collected by filtration, washed with water and air dried; yield 4.2 g. The product was purified by dissolving in 100 ml. of water at pH 9.0 (sodium carbonate) and slowly acidifying while seeding with crystalline material. Crystallization was allowed to proceed in the cold overnight. The product was filtered, washed with water and dried in vacuo over phosphorus pentoxide; yield 3.6 g., M.P. 160–167° decomp. The infrared and nuclear magnetic resonance spectra were fully consistent for the desired product.

Example 16

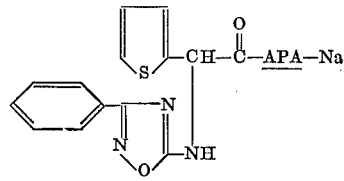

Sodium 6 - [D-α-(3-phenyl - 1,2,4 - oxadiazole-5-yl-amino)-2-thienylacetamido]-penicillanate.—A suspension of 10.2 g. (0.025 mole) of 6-(D-α-amino-2-thienylacetamido)penicillanic acid trihydrate in 50 ml. of water was brought into solution by adding aqueous sodium carbonate (5.3 g. of sodium carbonate in 50 ml. of water) to pH 8.8. Dioxane, 40 ml., was added followed by a solution of 4.54 g. (0.025 mole) of 5-chloro-3-phenyl-1,2,4-oxadiazole in 10 ml. of dioxane. The reaction mixture was stirred vigorously for 3 hours at room temperature while aqueous sodium carbonate was added dropwise as needed to maintain pH 8.5–9.0. The nearly clear solution was adjusted to pH 7.0 with 6 N hydrochloric acid. The dioxane was stripped off at reduced pressure. The aqueous concentrate was diluted with 50 ml. of water and extracted once with ethyl acetate. The aqueous phase was adjusted to pH 2.5 (6 N hydrochloric acid) causing the acid form of the product to separate as an oil. The product was extracted with 3 portions of ethyl acetate. The combined ethyl acetate extracts were washed three times with water, dried with sodium sulfate, filtered and treated with 9.5 ml. (0.025 mole) of sodium 2-ethylhexanoate in 1-butanol. Crystallization of the product was allowed to proceed for one hour at room temperature and then the mixture was concentrated slightly and some fresh ethyl acetate added. The product, sodium 6-[D-α-(3-phenyl - 1,2,4 - oxadiazole-5-yl-amino)-2-thienylacetamido]-penicillanate was collected by filtration, washed with ethyl acetate, dried overnight in vacuo over phosphorus pentoxide and further dried for two hours at 60° in a vacuum oven; yield 8.9 g., gradually decomposed 210–250°. The infrared and nuclear magnetic resonance spectra were fully consistent for the desired product.

Example 17

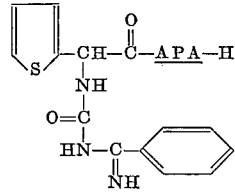

6 - [D - α - (3 - benzimidoylureido) - 2 - thienylacetamido]pencillanic acid.—A solution of 8.3 g. of sodium 6- [D - α - (3 - phenyl - 1,2,4 - oxadiazole -5 - yl - amino)-2-thienylacetamido]penicillanate in 200 ml. of water plus 20 ml. of dioxane was hydrogenated in the presence of commercial Raney nickel catalyst (No. 28) at an initial pressure of 50 p.s.i. in a Paar hydrogenation apparatus at room temperature for 1.5 hours, the theoretical amount of hydrogen being taken up. The catalyst was removed by filtration. The dioxane was stripped from the filtrate at reduced pressure. The remaining aqueous solution was adjusted to a volume of about 325 ml. by the addition of water and slowly adjusted to pH 5.5 with 6 N hydrochloric acid causing the separation of the product in crystalline form. The mixture was stirred for one-half hour in an ice bath. The product, 6 - [D - α - (3 - benzimidoylureido) - 2 - thienylacetamido]penicillanic acid, was collected by filtration, washed with water, air dried and further dried in vacuo over phosphorus pentoxide; yield 5.8 g., M.P. 178–180° decomp. with prior darkening. The infrared and nuclear magnetic resonance spectra were consistent for the desired product.

EXAMPLE 18

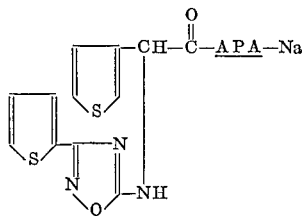

Sodium 6 - {D - α - [3 - (2' - thienyl) - 1,2,4 - oxadiazole - 5 -yl -amino] - 3 - thienylacetamido}pencillanate.—A suspension of 5.0 g. of 6-(D-α-amino-3-thienylactamido)pencillanic acid trihydrate in 50 ml. of water was adjusted to pH 9 with aqueous sodium carbonate (1.3 g. of sodium carbonate in 15 ml. of water). To this was added 25 ml. of dioxane followed by a solution of 5-chloro - 3 - (2' - thienyl) - 1,2,4 - oxadiazole in 25 ml. of dioxane. The reaction mixture was stirred at room temperature for 2 hours while aqueous sodium carbonate (1.3 g. of sodium carbonate in 15 ml. of water) was added as needed to maintain pH 8.5–9.0. The solution was adjusted to pH 7.5 with 6 N hydrochloric acid and the dioxane stripped off at reduced pressure. The aqueous concentrate was readjusted to pH 7.0 (6 H HCl) and extracted once with ethyl acetate. The aqueous phase was layered with ethyl acetate and acidified to pH 2.5 with 6 N HCl. An emulsion was obtained which was broken by filtering through diatomaceous earth. Two more extractions with ethyl acetate were made on the aqueous phase. The combined ethyl acetate extracts were washed three times with water, dried with sodium sulfate, filtered and treated with 4.6 ml. (0.012 mole) of sodium 2-ethylhexanoate in 1-butanol. Crystallization of the product was allowed to proceed in the cold overnight. The product, sodium 6 - {D - α - [3 - (2' - thienyl) - 1,2,4 - oxadiazole-5-yl-amino] - 3 - thienylacetamido}pencillanate, was collected by filtration and washed with ethyl acetate. The filtrate yielded a second crop on standing. Both crops were combined (yield 4.3 g.) and dried at 60° in a vacuum oven for 2.5 hours; M.P. 225–230° decomp. The infrared and nuclear magnetic resonance spectra were consistent for the desired compound.

EXAMPLE 19

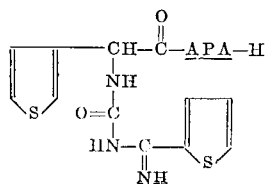

6 - {D - α - [3 - (2' - thienimidoyl)ureido] - 3 - thienylacetamido} - pencillanic acid.—A solution of 3.5 g. of sodium 6 - {D - α - [3 - (2' - thienyl) - 1,2,4 - oxadiazole-5-yl-amino]-3-thienylacetamido}-penicillanate in 100 ml. of water plus 40 ml. of dioxane was hydrogenated in the presence of commercial Raney nickel catalyst in a Paar hydrogenation apparatus at an initial pressure of 50 p.s.i. at room temperature for 2 hours. The catalyst was removed by filtration. The filtrate was adjusted to pH 7.3 with 6 N hydrochloric acid and the dioxane stripped off at reduced pressure. The aqueous concentrate was slowly adjusted to pH 4.0 (hydrochloric acid) and the product allowed to crystallize over the weekend. The product, 6 - {D - α - [3-(2' - thienimidoyl)ureido] - 3 - thienylacetamido}penicillanic acid, was collected by filtration, washed with water, and dried in vacuo over phosphorus pentoxide; yield 2.36 g.; M.P. decomp. above 160°.

Example 20

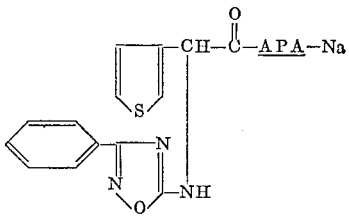

Sodium 6 - [D - α - (3 - phenyl - 1,2,4 - oxadiazole - 5-yl - amino) - 3 - thienylacetamido]penicillanate.—A suspension of 10.2 g. of 6-(D-α-amino-3-thienylacetamido) penicillanic acid trihydrate in 50 ml. of water was adjusted to pH 9 with sodium carbonate (5.3 g. of sodium carbonate in 50 ml. of water). The material did not all dissolve. Dioxane (35 ml.) was added and the mixture adjusted to pH 9 and a solution of 4.54 g. of 5-chloro-3-phenyl-1,2,4-oxadiazole in 15 ml. of dioxane added to the suspension. The mixture was stirred for 2 hours at room temperature while sodium carbonate solution was added as needed to maintain pH 8.5–9. The solution was adjusted to pH 7 with 6 N hydrochloric acid and the dioxane stripped off at reduced pressure. The aqueous concentrate was extracted once with ethyl acetate. The aqueous phase was adjusted to pH 2.5 with 6 N hydrochloric acid and extracted 3 times with ethyl acetate. The combined ethyl acetate extracts were washed 3 times with water, dried with sodium sulfate, filtered and treated with 9.5 ml. (0.025 mole) of sodium 2-ethylhexanoate in 1-butanol. The product was allowed to crystallize over the weekend in the cold. Crystallization seemed incomplete, therefore, the mixture was concentrated somewhat causing much additional product to crystallize. The product, sodium 6-[D - α - (3 - phenyl - 1,2,4 - oxadiazole - 5 - yl - amino)-3 - thienylacetamido]penicillanate, was collected by filtration, washed with ethyl acetate and air dried; yield 8.7 g. Seven g. of the air dried product was used for the reductive ring opening experiment. The remainder of the product was dried in vacuo at 60° for 2 hours; M.P. 240–245° decomp. with darkening above about 230°. The infrared and nuclear magnetic resonance spectra were consistent.

Example 21

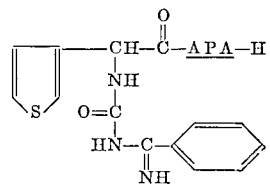

6 - [D - α - (3 - benzimidoylureido) - 3 - thienylacetamido]penicillanic acid.—A solution of 7.0 g. of sodium 6 - [D - α - (3 - phenyl - 1,2,4 - oxadiazole - 5 - yl-amino) - 3 - thienylacetamido]penicillanate in 200 ml. of water was hydrogenated in the presence of commercial Raney nickel catalyst in a Paar hydrogenation apparatus at an initial pressure of 50 p.s.i. at room temperature for 1.25 hours. The catalyst was removed by filtration. The filtrate was brought to a volume of 300 ml. with water. The solution was gradually adjusted to pH 4.5 with 6 N hydrochloric acid while stirring in an ice bath giving a crystalline precipitate of the product. The product, 6 - [D-α - (3 - benzimidoylureido) - 3 - thienylacetamido] - penicillanic acid, was collected by filtration, washed with water and dried in vacuo over phosphorus pentoxide; yield 5.6 g., M.P. 186–188° decomp. The infrared and nuclear magnetic resonance spectra were consistent with the desired product.

Example 22

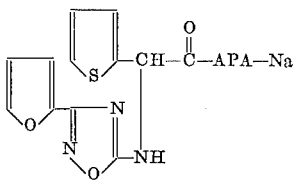

Sodium 6 - {D - α - [3 - (2' - furyl) - 1,2,4 - oxadiazole-5 - yl - amino] - 2 - thienylacetamido}penicillanate.—A suspension of 12 g. of 6-(D-α-amino-2-thienylacetamido) penicillanic acid trihydrate in 60 ml. of water was brought into solution by addition of aqueous sodium carbonate (6.2 g. of sodium carbonate in 60 ml. of water) to pH 8.8. Dioxane (35 ml.) was added followed by a solution of 5-chloro-3-(2'-furyl)-1,2,4-oxadiazole in 25 ml. of dioxane. The mixture was stirred at room temperature for two hours while aqueous sodium carbonate was added as needed to maintain pH 8.5–9. The solution was adjusted to pH 7 and the dioxane stripped off at reduced pressure. The aqueous concentrate was extracted once with ethyl acetate. The aqueous phase was adjusted to pH 2.5 with 6 N hydrochloric acid and extracted three times with ethyl acetate. The combined ethyl acetate extracts were washed three times with water, dried with sodium sulfate, filtered, and treated with 11 ml. (0.029 mole) of sodium 2-ethylhexanoate in 1-butanol. The solution was concentrated slightly and stored overnight in the cold. Crystallization of the product seemed incomplete, therefore, the mixture was concentrated further causing additional product to separate. The product, sodium 6 - {D - α - [3 - (2'-furyl) - 1,2,4 - oxadiazole - 5 - yl - amino] - 2 - thienylacetamido}penicillanate, was collected by filtration, washed with ethyl acetate and dried in vacuo over phosphorus pentoxide; yield 9.3 g. Seven g. of the product was removed for the reduction experiment, the remainder was dried for 2 hours at 60° in a vacuum oven; M.P. 230–234° decomp. with prior darkening. The infrared and nuclear magnetic resonance spectra were consistent for the desired product.

Example 23

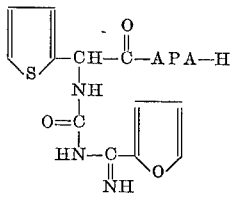

6-{D-α-[3-(2' - furimidoyl)ureido]-2-thienylacetamido}penicillanic acid.—A solution of 7 g. of sodium 6-{D-α-[3-(2'-furyl)-1,2,4-oxadiazole - 5 - yl-amino]-2-thienylacetamido}penicillanate in 20 ml. of water was hydrogenated in the presence of commercial Raney nickel catalyst (No. 28) at an initial pressure of 50 p.si. on a Paar hydrogenation apparatus at room temperature for 1.5 hours. The catalyst was removed by filtration. The filtrate was brought to a volume of 300 ml. with water and slowly adjusted to pH 4 with 6 N hydrochloric acid. After stirring for one-half hour in an ice bath the product, 6-{D-α-[3-(2'-furimidoyl)ureido] - 2 - thienylacetamido}penicillanic acid was collected by filtration, washed with water, air dried and finally dried for 2 hours at 60° in a vacuum oven; yield 4.8 g., M.P. 155–170° decomp. The infrared and nuclear magnetic resonance spectra were consistent for the desired compound.

The Minimum Inhibitory Concentration (M.I.C.) of certain of these products in mcg./ml. versus a strain of *Pseudomonas aeruginosa* was determined by overnight incubation at 37° C. in Nutrient Broth by serial two-fold tube dilution in an experiment in which the M.I.C. for sodium ampicillin was found to be 250 mcg./ml. with the following results:

| Ex. No. of compound: | M.I.C. |
|---|---|
| 15 | 16 |
| 17 | 8 |
| 19 | 16 |
| 21 | 16 |

ILLUSTRATIVE PREPARATIONS OF STARTING REAGENTS (A) Ring-substituted 2-phenylglycines Substituted DL 2-phenylglycines are prepared by alkaline hydrolysis of the appropriate 5-arylhydantoins which in turn are prepared from substituted benzaldehydes by the method of Bucherer and Leib, J. Prakt. Chem., 141, 5(1934); for additional examples of this procedure see also U.S. Pat. 3,140,282. The substituted DL 2-phenylglycines are resolved, if desired, via their N-formyl derivatives as described by E. Fisher et al., Ber. 41, 1286 (1908) or by one of the procedures illustrated below.

D-α-acetamido-phenylacetic acid.—A suspension of 50 g. (0.331 mole) of D-(−)-2-phenylglycine in 700 ml. of water was cooled to 0 to 5° C. and 13.2 g. (0.331 mole) of sodium hydroxide was added with stirring to produce a solution. Acetic anhydride (67.5 g., 0.662 mole) was added rapidly in one portion to the vigorously stirred solution which was initially cooled to 0 to 5° C. by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25° C. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188° C., $[\alpha]_D^{24}$ −217.9° (c.=1% ethanol).

D-α-acetamido - 4 - nitrophenylacetic acid.—D-α-acetamidophenylacetic acid (20 g., 0.104 mole) was slowly added to 50 ml. of concentrated sulfuric acid with cooling as needed to maintain the temperature at 20 to 25° C. The mixture was stirred for about 20 minutes until most of the solid dissolved. Nitric acid (90%, $d$=1.5, 9.7 ml., 0.208 mole) was added dropwise at such a rate to the stirred mixture that the salt-ice cooling bath maintained the temperature in the range 0 to −5° C. The reaction mixture was stirred at −5 to −10° C. for an additional 30 minutes and then poured onto about 300 g. of ice flakes. The white crystalline product was collected by filtration, washed with water and recrystallized three times from 1:1 95% ethanol-water; M.P. 180–182° C. dec., yield 11.5 g. (46.4%). An additional recrystallization from ethyl acetate did not change the melting point; $[\alpha]_D^{24}$ −206.4° (c.=5%, ethanol).

*Analysis.*—Calc'd for $C_{10}H_{10}N_2O_5$ (percent): C, 50.42; H, 4.23; N, 11.76. Found (percent): C, 50.14; H, 4.07; N, 11.96.

D-α-acetamido-4-aminophenylacetic acid.—A solution of 15 g. (0.063 mole) of D-α-acetamido-4-nitrophenylacetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° C. dec. The product was recrystallized four times from 1:1 95% ethanol-water, weight 4.8 g., M.P. 207–209° C. dec., $[\alpha]_D^{24°}$ −182.2° (c.=0.5% 1 N HCl).

*Analysis.*—Calc'd for $C_{10}H_{12}N_2O_3$ (percent): C, 57.71; H, 5.81; N, 13.46. Found (percent): C, 57.61, 57.64; H, 5.67; N, 13.18.

D-α-acetamido-4-iodophenylacetic acid.—To a solution of 5.0 g. (0.024 mole) of D-α-acetamido-4-aminophenylacetic acid in 70 ml. of trifluoroacetic acid at −5 to 0° was added slowly 1.8 g. of sodium nitrite. The solution was stirred for 25 minutes. Solid potassium iodide (4.8 g., 0.024 mole) was added at 0 to 5°. The temperature of the dark brown mixture was increased to 30° whereupon a vigorous gas evolution occurred. The mixture was maintained at 30° for 45 minutes and then heated at reflux for one half-hour. The trifluoroacetic acid phase was decanted from the dark colored insoluble material. The trifluoroacetic acid was distilled off at reduced pressure. The residue was taken up in 50 ml. of water. After ice cooling there was obtained a precipitate of brown solid. Two recrystallizations from 1:1 95% ethanol-water gave D-α-acetamido-4-iodophenylacetic acid; M.P. 217° dec. with darkening at 202°, $[\alpha]_D^{24°}$ −173.2° (c.=0.5, 95% ethanol).

*Analysis.*—Calc'd for $C_{10}H_{10}INO_3$ (percent): C, 37.64; H, 3.16; N, 4.39. Found (percent): C, 37.84; H, 3.30; N, 4.34.

The dark colored insoluble material was slurried with water and treated with 1 M sodium thiosulfate to remove the iodine color. The solid was filtered, washed with water and twice recrystallized from 1:1 95% ethanol-water with a carbon treatment giving additional product: $[\alpha]_D^{24°}$ −170.6° (c.=0.5, 95% ethanol).

*Analysis.*—Calc'd for $C_{10}H_{10}INO_3$ (percent): C, 37.64; H, 3.16; N, 4.39. Found (percent): C, 37.70; H, 3.25; N, 4.45.

D-α-amino-4-iodophenylacetic acid.—A suspension of 3.7 g. (0.011 mole) of D-α-acetamido-4-iodophenylacetic acid in 15 ml. of 2 N hydrochloric acid plus sufficient dioxane to give a solution at the boiling point was heated at reflux for 1.5 hours. The solvent was distilled off at reduced pressure. The residue was extracted with water, the insoluble material (solid A) being removed by filtration. The filtrate was stripped to dryness at reduced pressure and the solid residue was extracted with water, the insoluble material (solid B) again removed. The filtrate was again evaporated to dryness and the residue extracted with water and the insoluble material (solid C) again removed. The filtrate was stripped to dryness giving solid D as residue. The infrared spectra (KBr) showed solids A and B to be amino acid zwitter ion and solid C to be mostly amino acid hydrochloride.

Solid A was hydrolyzed in 2.5 N hydrochloric acid plus dioxane for 1.75 hours. The solution was evaporated to dryness, the residue taken up in water, a small amount of insoluble material removed by filtration, and the filtrate evaporated to dryness leaving solid E. An infrared spectrum (KBr) showed solid E to be a mixture of amino acid hydrochloride and zwitter ion.

Solids D and E were combined in water and the system adjusted to pH 4.5 giving 1.55 g. of D-α-amino-4-iodophenylacetic acid; M.P. 204–205° dec., $[\alpha]_D^{24°}$ −99.4° (c.=0.5, 1 N HCl).

*Analysis.*—Calc'd for $C_8H_8INO_2$ (percent): C, 34.68; H, 2.91; N, 5.06. Found (percent): C, 34.63; H, 3.24; N, 4.77.

D-α-amino-4-iodophenylacetic acid.—D-α-acetamidophenylacetic acid (Beil. 14, 591) (200 g., 1.036 mole) was added slowly to a solution of 161.1 g. (0.52 mole) of silver sulfate in 1.2 l. of conc. sulfuric acid with cooling as needed to keep the temperature below 30°. Finely pulverized iodine (684 g., 2.7 mole) was added in portions during 1.5 hours. The mixture was stirred at room tempertaure for 1.5 hours longer. The mixture was filtered through a sintered glass filter and the filtrate poured into ca. 3 l. of crushed ice. The solid was filtered, washed with water, and air dried. The material was recrystallized from 650 ml. of 2-propanol (the hot solution was filtered to remove some insoluble material) giving solid A; yield 46.6 g., M.P. 175–183° dec. The filtrate was concentrated and stored in the cold overnight giving solid B; yield 132 g., M.P. 160–168°. Solids A and B were crude D-α-acetamido-4-iodophenylacetic acid.

Solid B was combined with 500 ml. of 2 N hydrochloric acid and refluxed for one hour. The insoluble material (solid C) was removed by filtration and washed with water; yield 100 g., M.P. 180–183°.

Solid C was hydrolyzed in 200 ml. of 2 N hydrochloric acid plus enough dioxane to solubilize the material. After 2.25 hours at reflux the solvent was distilled off at reduced pressure and the residue extracted with 250 ml. of water. The insoluble material (solid D) was removed by filtration. The filtrate was adjusted to pH 4.5 and after cooling in an ice bath the precipitate was filtered, washed with water, and triturated with boiling 95% ethanol giving 10.8 g. of D-α-iodophenylacetic acid.

Solid A was hydrolyzed in 2 N hydrochloric acid plus dioxane for two hours and the solvent distilled off at reduced pressure. The residue was extracted with water. The insoluble material (solid F) was removed by filtration. The filtrate was adjusted to pH 4.5 giving crystalline D-α-amino-4-iodophenylacetic acid; yield 14.4 g., $[\alpha]_D^{24°}$ −86.2° (c.=0.5, 1 N HCl).

Solids D and F were combined and suspended in 350 ml. of water. The suspension was adjusted to pH 4.5 with 20% sodium hydroxide. The solid was filtered, washed with water, air dried, and triturated with 300 ml. of boiling 95% ethanol giving 42.5 g. of D-α-amino-4-iodophenylacetic acid; $[\alpha]_D^{24°}$ −99.8° (c.=0.5, 1 N HCl).

D-α-amino-4-iodophenylacetyl chloride hydrochloride.—A suspension of 42.3 g. (0.15 mole) of finely ground D-α-amino-4-iodophenylacetic acid in 1.5 l. of methylene chloride was gassed at 0 to 5° with anhydrous hydrogen chloride and 40.6 g. (0.195 mole) of phosphorus pentachloride added. The mixture was stirred for two hours at 5°. Skellysolve B (800 ml.) was added to the reaction mixture and the product collected by filtration. The product was washed with Skellysolve B and dried in vacuo; yield 40.9 g. (82%).

D-α-acetamido-3-iodophenylacetic acid.—To a solution of 50.0 g. (0.24 mole) of D-α-acetamido-3-aminophenylacetic acid in 550 ml. of trifluoroacetic acid at −5° was added 17.0 g. of 97% sodium nitrite gradually during 10 minutes. The solution was stirred at −5° for 25 minutes longer. The diazonium salt solution was added in a steady stream to a vigorously stirred suspension of 79.0 g. of potassium iodide and 2.5 g. of iodine in 300 ml. of trifluoracetic acid initially at 23°. During the addition the temperature rose to 25–27° and steady gas evolution was noted. The mixture was stirred for 3.5 hours at room temperature until the gas evolution ceased. The reaction mixture was filtered leaving a quantity of dark gummy solid. The filtrate was concentrated to a small volume, water added, and further concentrated. The concentrate containing a solid was treated with dilute sodium thiosulfate and the solid collected by filtration. Recrystallization from 4:1 water −95% ethanol gave 19.5 g. of D-α-acetamido-3-iodophenylacetic acid; M.P. 181–181.5°, $[\alpha]_D^{24°}$ −158.0° (c.=0.5, 95% ethanol).

*Analysis.*—Calc'd. for $C_{10}H_{10}INO_3$ (percent): C, 37.64; H, 3.16; N, 4.39; I, 39.77. Found (percent): C, 37.80; H, 3.07; N, 4.55; I, 39.20.

D-α-amino-3-iodophenylacetic acid.—D-α-acetamido-3-iodophenylacetic acid (10.0 g.) in 45 ml. of 2 N hydrochloric acid plus sufficient dioxane to give a solution at the boiling point was refluxed for 2.25 hours. The solvent was evaporated to dryness and the residue extracted with water. The insoluble material (solid A) was removed by filtration. The filtrate was evaporated to dryness and the residue in water was adjusted to pH 4.5 with sodium hydroxide giving 1.0 g. of D-α-amino-3-iodophenylacetic acid; M.P. 192–195°, $[\alpha]_D^{24°}$ −81° (c. 0.5, 1 N HCl).

The filtrate deposited a second crop of amino acid on storage in the cold; yield 0.6 g., M.P. 203–204.5°, $[\alpha]_D^{24°}$ −101.4° (c. 0.5, 1 N HCl).

Solid A (which was chiefly amide) was hydrolyzed with 45 ml. 2 N hydrochloric acid plus dioxane for two hours at reflux. The residue remaining after evaporation of the solvent was combined with water and again evaporated to drynesss. The residue in water was adjusted to pH 4.5 giving 1.9 g. of D-α-amino-3-iodophenylacetic acid; M.P. 196–199°, $[\alpha]_D^{24°}$ −95° (c.=0.5, 1 N HCl).

The infrared and nuclear magnetic resonance spectra of the three fractions were consistent with the desired product.

D - α - amino-3-iodophenylacetyl chloride hydrochloride.—A suspension of 2.5 g. (0.009 mole) of D-α-amino-3-iodophenylacetic acid in 100 ml. of methylene chloride at 0 to 5° was gassed with anhydrous hydrogen chloride and 2.5 g. (0.012 mole) of phosphorus pentachloride added. After stirring for 24 hours at 0 to 5° an additional 1.2 g. of phosphorus pentachloride was added and stirring continued for a total of 38 hours. The reaction mixture was diluted with Skellysolve B, the product filtered, washed with Skellysolve B, and dried in vacuo; yield 1.2 g.

D - (−)-α-amino-α-(3-chloro-4-hydroxyphenyl)glycine. —To a stirred suspension of 5.01 g. (0.03 mole) of D-(−)-2-(p-hydroxyphenyl)glycine in 100 ml. of glacial acetic acid was bubbled in HCl gas at vigorous rate for about 5 minutes. At first a clear solution resulted and then the hydrochloride salt crystallized out. Next, 4.45 g. (0.033 mole) of sulfuryl chloride (freshly distilled) in 25 ml. of glacial acetic acid was added, with stirring, over a 30 minute period, dropwise. The temperature was 26°–27° C. throughout the addition. After one hour stirring, 250 ml. of dry ether was added slowly and crystallization began. After 15 min. the product was filtered off, washed with dry ether and air dried. The 7 g. obtained was dissolved in 50 ml. of 1 N HCl, filtered, and the pH adjusted, with cooling, to 5 with conc. NH₄OH. The resulting crystalline product was filtered off after 5 min. standing, washed with two 20 ml. portions of water and 5× with acetone. The vacuum dried material weighed 4.6 g.; dec. pt. 217° C. (sharp). The NMR and IR spectra were consistent with the desired structure. $[\alpha]_D^{22° C.}$ −137.1° (c.= 1%, 1 N HCl).

*Analysis.*—Calc'd for $C_8H_8ClNO_3$ (percent): C, 47.76; H, 4.01; Cl, 17.66. Found (percent): C, 47.16; H, 3.92; Cl, 17.96.

dl-2-(p-Methoxyphenyl)-glycine.—To a stirred solution of 19.6 g. (0.4 mole) of NaCN in 80 ml. of H₂O was added 23.6 g. (0.450 mole) of NH₄Cl and 20 ml. of conc. NH₄OH followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of H₂O and then 240 ml. of 6 N HCl added with good mixing and the MIBK was removed in vacuo. The resulting slurry was heated at reflux (now in solution) for two hours. One hundred ml. of H₂O was added to the hot solution and then 8 g. of decolorizing carbon added and after ten minutes at gentle-reflux the carbon was filtered off and washed with 50 ml. of hot water. The combined filtrates (hot) were stirred and treated with conc. NH₄OH until pH 5–6 was obtained (pH paper). The slurry was then cooled to 5° C. and after one hour the crystals were filtered off and washed with two 100 ml. portions of water. The damp cake was then slurried in 250 ml. of water and 50% NaOH added slowly until the product dissolved. Two 300 ml. ether extracts were then taken and discarded. The pH was then adjusted to 5.5 with 6 N HCl with cooling. After one hour the product was filtered off, washed with 3×100 ml. H₂O and air dried. Yield 40 g.; dec. 244° C. with sublimation at 230° C.

dl-2-(p-Methoxyphenyl)-N-(chloroacetyl glycine.—To a stirred suspension of 36 g. (0.2 mole) of dl-2-(p-methoxyphenyl)-glycine in 500 ml. of H₂O was added 8 g. (0.2 mole) of NaOH pellets and when a clear solution was obtained the solution was cooled to 5° C. and with vigorous stirring 68.2 g. (0.4 mole) of chloroacetic anhydride (warm) was added all at once. Then a solution of 16 g. (0.4 mole) of NaOH in 100 ml. of H₂O was added over a 10 to 15 minute period. More 20% NaOH was added as needed to keep the pH at about 9 for a 1.5 hour period. Next, the pH was adjusted to 2 with 40% H₃PO₄. The product crystallized immediately and was filtered off, washed with water and recrystallized from ethanol-water to give 38 g. of product melting at 182–183° C.

*Analysis.*—Calc'd for $C_{11}H_{12}ClNO_4$ (percent): C, 51.21; H, 4.69. Found (percent): C, 51.49; H, 4.90.

D - (−) - 2 - (p-methoxyphenyl)-N-chloroacetylglycine and L-(+)-2-(p-methoxyphenyl)-glycine.—To 800 ml. of H₂O stirred at 37° C. was added 38 g. (0.148 mole) of dl-2-(p - methoxyphenyl) - N-chloroacetylglycine and NH₄OH added dropwise until pH 7.8 was obtained. To the resulting solution was added 2 g. of hog kidney acylase (Sigma Chemical Company) and stirring continued at 37° C. (internal) for 21 hours. The solids containing crude L-(+)-2-(p-methoxyphenyl)-glycine were then filtered off and washed with 2×100 ml. H₂O and the pH of the combined filtrates adjusted to 4–5 with glacial acetic acid. This solution was heated on the steam bath for 30 min. with 5 g. of decolorizing carbon and then filtered. The carbon cake was washed with 50 ml. of warm water and the combined filtrates cooled and acidified to pH 2 with 40% H₃PO₄. After one hour cooling at 0° C. the crystalline product was filtered off and washed with cold water (3×) and air dried. The yield was 16 g. D-(−)-2-(p-methoxyphenyl)-N-chloroacetylglycine and when a second run using 5× the above amounts were used a yield of 83 g. (87% yield) was obtained. M.P. 170°–171° C.; $[\alpha]_D^{25°}$ C.−193° (c.=1%, ethanol).

*Analysis.*—Calc'd for $C_{11}H_{12}ClNO_4$ (percent): C, 51.21; H, 4.69. Found (percent): C, 51.50; H, 4.99.

When the solids containing crude L-(+)-2-(p-methoxyphenyl)-glycine are treated with hot 3 N HCl (200 ml.) and carbon followed by filtration and pH adjustment to 5.5 there is obtained 6 g. (first run) of pure L-(+)-2-(p-methoxyphenyl)glycine. $[\alpha]_D^{25°}$ C.+150.4° (c.=1%, 1 N HCl).

D-(−)-2-(p-methoxyphenyl)-glycine.—The 16 g. of D-(−)-2-(p-methoxyphenyl)-N-chloroacetylglycine was refluxed 1.5 hours in 170 ml. of 2 N HCl. The resulting clear solution was filtered and cooled at 5° C. and the pH adjusted to 5.5 with NH₄OH.

The product was then filtered off after cooling 30 min. and washed with 3× 25 ml. of cold water. The dried material D-(−)-2-(p-methoxyphenyl)-glycine weighed 9.5 g. A second run gave 54 g.

$[\alpha]_D^{25°}$ C.−149.9° (c.=1%, 1 N HCl) (first run)
$[\alpha]_D^{25°}$ C.−148.1° (c.=1%, 1 N HCl) (second run)

*Analysis.*—Calc'd for $C_9H_{11}NO_3$ (percent): C, 59.67; H, 6.13; N, 7.74. Found (percent): C, 59.38; H, 6.16; N, 8.00.

D-(−)-2-(p-hydroxyphenyl)-glycine.—A mixture of 1.81 g. (0.01 mole) of D-(−)-2-(p-methoxyphenyl)glycine ($[\alpha]_D^{25°}$ C.−149.9° c.=1%, 1 N HCl) and 10 ml. of 48% HBr was heated at gentle reflux for 2 hours. The resulting solution was concentrated at reduced pressure at 30° C. to a wet solid. A minimum amount of water (20°

C.) was added to dissolve the HBr salt and with cooling NH₄OH was added to pH 5. The resulting thick gel which ppt. was warmed to 50° C. and when solution was nearly obtained a different crystalline form began to ppt. Upon cooling 30 min. at 0°–5° C. there was obtaind 990 mg. of cold water washed (3× 1 ml.) and air dried material, D-(−)-2-(p-hydroxyphenyl)glycine. $[\alpha]_D^{25°}$ C.−161.2° (c.=1%, 1 N HCl) dec. pt. 223° C. A second run using 20× the above amounts gave 24.5 g. of material. $[\alpha]_D^{25°}$ C.−153° (c.=1%, 1 N HCl).

*Analysis.*—Calc'd for $C_8H_9NO_3$ (percent): C, 57.49; H, 5.43; N, 8.39. Found (percent): C, 57.41; H, 5.67; N, 8.39.

D-(−) - 2 - (3,5-dichloro-4-hydroxyphenyl)-glycine.— To a stirred suspension of 5.01 g. (0.03 mole) of D-(−)-2-(4-hydroxyphenyl)glycine in 100 ml. of glacial acetic acid was bubbled in HCl gas at a vigorous rate for about 5 minutes. At first a clear solution resulted and then the hydrochloride salt crystallized out. Next, 9.0 g. (0.067 mole) of sulfuryl chloride (freshly distilled) in 25 ml. of glacial acetic acid was added, with stirring, over a 30 minute period, dropwise. The temperature was 26°–27° C. throughout the addition. After the sulfuryl chloride addition, the slurry was heated to 70° C. for 30 minutes and then stirred at ambient temperature for two hours. Then 250 ml. of dry ether was added slowly and crystallization began. After 15 min. the product was filtered off, washed with dry ether and air dried. The 7 g. obtained was dissolved in 100 ml. of 1 N HCl, filtered, and the pH adjusted, with cooling to 5 with conc. NH₄OH. The resulting crystalline product was filtered off after 5 min. standing, washed with two 20 ml. portions of water and 5× with acetone. The vacuum dried material weighed 4.5 g.; dec. pt. 210° (sharp). The NMR and IR spectra were consistent with the desired structure. $[\alpha]_D^{22°}$ C.−126.3° (c.=1%, 1 N HCl).

*Analysis.*—Calc'd for $C_8H_7Cl_2NO_3$ (percent): C, 40.78; H, 2.99; Cl, 30.04. Found (percent): C, 41.85; H, 3.22; Cl, 27.80.

Resolution of DL-α-amino - 3 - methoxyphenylacetic acid.—DL-α-amino-3-methoxyphenylacetic acid [A. H. Neims, D. C. De Luca, L. Hellerman, Biochemistry, 5 (1), 203 (1966)] was resolved with d-10-camphorsulfonic acid in water.

DL-α-amino-3-methoxyphenylacetic acid (33.1 g., 0.182 mole) was added to a solution of 46.4 g. (0.2 mole) of d-10-camphorsulfonic acid in 135 ml. of water at 50 to 60°. The solution was filtered and stored in the cold for 20 hours. The precipitated amino acid d-10-camphorsulfonate salt was collected by filtration. The salt was repeatedly recrystallized from water until a sample of the amino acid regenerated from it showed no further change in optical rotation. Thus, after three recrystallizations from water, there was obtained 3.7 g. of the d-10-camphorsulfonate salt of D-α-amino-3-methoxyphenylacetic acid; M.P. 184–185° dec. The salt (1.4 g.) was dissolved in about 10 ml. of water by warming. The solution was adjusted to pH 5–6 with concentrated ammonium hydroxide. The product was allowed to crystallize first at room temperature and then in an ice bath giving, after filtration and drying in vacuo over phosphorus pentoxide. 0.36 g. of D-α-amino-3-methoxyphenylacetic acid; M.P. 178–181° dec., $[\alpha]_D^{24°}$ −129.0° (c.=0.5, 1 N HCl). A portion of the amino acid was recrystallized from water and dried in vacuo over phosphorus pentoxide; M.P. 180–182° dec., $[\alpha]_D^{24°}$ −136° (c.=0.08, 1 N HCl).

*Analysis.*—Calc'd for $C_9H_{11}NO_3 \cdot \frac{1}{3}H_2O$ (percent): C, 57.74; H, 6.28; N, 7.48. Found (percent): C, 57.70, 57.76; H, 6.23, 6.18; N, 7.21.

D-α-amino-3-hydroxyphenylacetic acid hydrobromide monohydrate.—D-α-amino - 3 - methoxyphenylacetic acid (2.9 g., 0.016 mole) and 16 ml. of 48% hydrobromic acid were refluxed for two hours. The volatile materials were removed at reduced pressure. Water (about 15 ml.) was added to the residue and this removed at reduced pressure. This was repeated once. The residue was dried in vacuo to remove all water. The dried residue was recrystallized by dissolving in 2-propanol and adding Skellysolve B to the cloud point. After drying there was obtained 3.0 g. of D-α-amino-3-hydroxyphenylacetic acid hydrobromide monohydrate; M.P. 156–162° dec., $[\alpha]_D^{24°}$ −62° (c.=0.1, water). The infrared and nuclear magnetic resonance spectra were consistent with the desired product.

*Analysis.*—Calc'd for $C_8H_9NO_3 \cdot HBr \cdot H_2O$ (percent): C, 36.10; H, 4.55; N, 5.26. Found (percent): C, 37.03; H, 5.12; N, 5.34.

(2) D-α-acetamido-3-nitrophenylacetic acid.—A stirred suspension of 49.8 g. (0.254 mole) of D-α-amino-3-nitrophenylacetic acid [P. Fries, K. Kjaer, Acta Chimica Scand., 17, 2391 (1963)] in 500 ml. of water was cooled in an ice bath and a solution of 9.36 g. (0.209 mole) of NaOH in 40 ml. of water was added causing most of the solid to dissolve. There was immediately added 42.7 g. (0.418 mole) of acetic anhydride followed by the addition as needed of a solution of 25.1 g. (0.627 mole) of sodium hydroxide to maintain the pH value at about 7. The reaction mixture was stirred in the ice bath for an additional 15 minutes, filtered, and adjusted to pH 1.8 with concentrated hydrochloric acid. The crystalline product was collected by filtration and washed with water; yield 25 g., M.P. 172–174° dec. The product was twice recrystallized from 1:1 95% ethanol-water giving, after drying in vacuo over phosphorus pentoxide, 11.8 g. of D-α-acetamido-3-nitrophenylacetic acid, M.P. 183–185°; $[\alpha]_D^{24°}$ −179.4° (c.=0.5, 95% ethanol). The infrared and nuclear magnetic resonance spectra were consistent with the desired compound.

*Analysis.*—Calc'd for $C_{10}H_{10}N_2O_5$ (percent): C, 50.42; H, 4.23; N, 11.76. Found (percent): C, 50.56; H, 4.20; N, 11.73.

D-α-acetamido-3-aminophenylacetic acid.—A solution of 9 g. (0.0378 mole) of D-α-acetamido-3-nitrophenylacetic acid in 150 ml. of methanol was hydrogenated using 0.6 g. of 5% palladium on carbon at an initial pressure of 50 p.s.i. on a Paar hydrogenation apparatus for 30 minutes. The hydrogenation bottle was cooled with a jet of air to keep the temperature under 40°. The catalyst was removed by filtration. Evaporation of the filtrate gave a crystalline product. Two recrystallizations from 1-propanol gave 3.4 g. of D-α-acetamido-3-aminophenylacetic acid, M.P. 200–201° dec.; $[\alpha]_D^{24°}$ −174.4° (c.=0.5 water).

*Analysis.*—Calc'd for $C_{10}H_{12}N_2O_3$ (percent): C, 57.71; H, 5.81; N, 13.46. Found (percent): C, 57.78; H, 5.97; N, 13.35.

D-α-amino-3-hydroxyphenylacetic acid.—A solution of 2.1 g. (0.01 mole) of D-α-acetamido-3-aminophenylacetic acid in 35 ml. of trifluoroacetic acid was cooled to −5° and 0.69 g. (0.01 mole) of solid sodium nitrite added. After stirring for 20 minutes at −5° acetic acid (5 ml.) was added. The mixture was stirred at 45 to 50° for one and one-half hours and then heated on the steam bath for one-half hour. The cold reaction mixture was poured onto 30 g. of crushed ice. The volatile materials were distilled at reduced pressure leaving as residue a slightly brown viscous oil. The residue was combined with 30 ml. of 2 N hydrochloric acid and refluxed for one and one-half hours. The volatile materials were removed under reduced pressure. Water was added to the residue and this removed under reduced pressure causing the hydrochloride salt of the product to crystallize. The residue was dissolved in a minimum amount of water, adjusted to pH 4.5 with 20% sodium hydroxide, filtered, and stored in the cold giving 0.43 g. of crystalline D-α-amino-3-hydroxyphenylacetic acid, M.P. 204–206° dec. The filtrate was stripped to dryness and a small amount of water added to the crystalline residue giving a 2nd crop (0.46 g.) of the amino acid.

The filtrate from the 2nd crop plus 3 ml. of concentrated hydrochloric acid were concentrated to dryness. The cooling gave crystalline D-α-amino-3-hydroxyphenylacetic acid hydrochloride monohydrate; yield 0.5 g., M.P. 150–153° dec., $[\alpha]_D^{24°}$ —91.2° (c.=0.5, water). The infrared and nuclear magnetic resonance spectra were consistent with the desired product.

*Analysis.*—Calc'd for $C_8H_9NO_3 \cdot HCl \cdot H_2O$ (percent): C, 43.35; H, 5.46; N, 6.32. Found (percent): C, 42.7; H, 5.6; N, 6.17; residue, 1.45. Values corrected for 1.45% residue: C, 43.3; H, 5.7; N, 6.26.

The two crops of D-α-amino-3-hydroxyphenylacetic acid were combined, suspended in a small amount of water, 2 ml. of 48% hydrobromic acid added and the filtered solution evaporated to dryness. The residue was twice recrystallized from water giving 150 mg. of D-α-amino-3-hydroxyphenylacetic acid hydrobromide monohydrate; M.P. 172–175° dec., $[\alpha]_D^{24°}$ —74° (c.=0.1, water). The infrared and nuclear magnetic resonance spectra were consistent with the assigned structure.

*Analysis.*—Calc'd for $C_8H_9NO_3 \cdot HBr \cdot H_2O$ (percent): C, 36.10; H, 4.55; N, 5.26. Found (percent): C, 36.20; H, 4.62; N, 5.32.

D-α-amino-3-hydroxyphenylacetic acid.—A solution of 38.4 g. (0.1845 mole) of D-α-acetamido-3-aminophenylacetic acid in 600 ml. of trifluoroacetic acid prepared at 15 to 20° was cooled to 5° and 13 g. (0.1845 mole) of 98% sodium nitrite added in portions during a 10-minute period with stirring at —5°. After stirring for an additional 25 minutes 90 ml. of acetic acid was added at —5 to 0°. The mixture was heated at 45 to 50° for one and one-half hours (gas evolution) refluxed for one-half hour, cooled, and poured onto 500 g. of ice flakes. The volatile materials were removed at reduced pressure. The residue was refluxed with 400 ml. of 2 N hydrochloric acid for one hour. Concentration to a small volume gave the crystalline hydrochloride salt. The dried product (27 g.) was recrystallized from wet acetic acid (150 ml. acetic acid plus 7 ml. of water) giving 21 g. of D-α-amino-3-hydroxyphenylacetic acid hydrochloride monohydrate; M.P. 149–152° dec., $[\alpha]_D^{24°}$ —103.0° (c.=0.5, water).

D-α-amino-4-acetamidophenylacetic acid.—D-α-acetamido-4-aminophenylacetic acid (39.2 g., 0.188 mole) in 400 ml. of 2 N hydrochloric acid was refluxed for two hours. The mixture was concentrated to dryness at reduced pressure. Water was added and the solution again concentrated to dryness. This was repeated once. The crystalline residue was slurried with 2-propanol, filtered, and washed additionally with 2-propanol giving, after air drying, 47 g. of the hydrochloride of D-α-amino-4-aminophenylacetic acid.

Ten g. of the hydrochloride in 40 ml. of water was adjusted to pH 4.8 with 20% sodium hydroxide. Crystalline D-α-amino-4-aminophenylacetic acid separated. To the solution obtained by adding 160 ml. additional of water was added 10 ml. of thioacetic acid. The mixture was stirred for 17 hours at 24° under a nitrogen atmosphere. The reaction mixture, containing a quantity of crystalline product, was concentrated to one-half of its initial volume giving 4.5 g. of product. The crude product was suspended in water, the suspension adjusted to pH 4.6 with 20% NaOH, heated to 95°, carbon treated, and the product allowed to crystallize in the cold overnight. The resulting gelatinous mass was broken up by warming. The solid was removed by filtration, wt. 0.2 g., M.P. 203–206° dec. The filtrate was diluted with an equal volume of 95% ethanol giving 1.4 g. of D-α-amino-4-acetamidophenylacetic acid; M.P. 214–215° dec., $[\alpha]_D^{24°}$ —133.4° (c.=0.5, 1 N HCl).

*Analysis.*—Calc'd for $C_{10}H_{12}N_2O_3$ (percent): C, 57.71; H, 5.814; N, 13.46. Found (percent): C, 56.80, 56.72; H, 5.84, 5.89; N, 13.62; $H_2O$, 1.32. Found values corrected for 1.32% water: C, 57.52; H, 5.71; N, 13.80.

D-α-amino-3-aminophenylacetic acid.—A solution of 9.8 g. (0.05 mole) of D-α-amino-3-nitrophenylacetic acid [P. Friis and A. Kjaer, Acta Chimica Scand. 17, 2391 (1963); British patent specification, 1,033,257] in 200 ml. of water was prepared by adjusting the mixture to pH 9.3 with concentrated ammonium hydroxide. The solution was hydrogenated for 1 hour in the presence of 0.4 g. of 5% palladium on carbon on a Paar hydrogenation apparatus at an initial pressure of 50 p.s.i. The vessel was cooled as needed to keep the temperature from going above 30°. After 1 hour an additional 0.4 g. of catalyst was added and hydrogenation continued for 1 hour longer. Three additional runs were made hydrogenating a total of 39.4 g. of nitro compound. Addition of the second amount of catalyst was omitted in the additional runs and a hydrogenation time of about 1 hour was used. Each run was filtered to remove catalyst, the filtrates pooled and concentrated to a small volume until crystallization of the product started. The concentrate was diluted with about five volumes of 95% ethanol, the mixture stored overnight in the cold and the product filtered and washed further by slurrying with 95% ethanol. After drying in a vacuum oven for 3 hours at 40° and then in vacuo over phosphorus pentoxide for 64 hours there was obtained 25.7 g. of D-α-amino-3-aminophenylacetic acid; M.P. 188–191°, $[\alpha]_D^{24°}$ —139.0 (c.=1 in HCl).

The preparation of this compound has been described by P. Friis and A. Kjaer, Acta Chimica Scand. 17, 2391 (1963).

D-α-amino-3-acetamidophenylacetic acid.—A mixture of 5 g. (0.0301 mole) of D-α-amino-3-aminophenylacetic acid and 5 ml. of thioacetic acid in 100 ml. of water was stirred for 16 hours under a nitrogen atmosphere. The mixture was heated on a steam bath for one-half hour and then concentrated at reduced pressure to a small volume. On cooling the concentrate the product started to crystallize. The concentrate was diluted with 95% ethanol and, after chilling in an ice bath, the product was filtered and washed with 95% ethanol; wt. 1.8 g. The filtrate was further diluted with 95% ethanol giving an additional 2.3 g. of product. The two crops of product were combined, dissolved in a small amount of water by warming, the solution concentrated slightly and diluted with a large volume of 95% ethanol. The initial crop of solid was removed by filtration and the filtrate stored in the cold for 16 hours giving, after drying at 65° for 3 hours in vacuo over phosphorus pentoxide, 0.90 g. of product, M.P. 185–187° dec. The product was twice recrystallized from 1:1 95% ethanol-water; wt. 0.36 g., M.P. 186–187° dec., $[\alpha]_D^{24°}$ —120° (c.=0.5, 1 N HCl).

*Analysis.*—Calc'd for $C_{10}H_{12}N_2O_3$ (percent): C, 57.7; H, 5.81; N, 13.5. Found (percent): C, 47.29; H, 6.79; H, 11.21; $H_2O$, 18.3. Found values corrected for 18.3% water: C, 57.9; H, 5.83; N, 13.7.

DL-α-amino-3-chlorophenylacetic acid.—A solution of 250 g. of m-chlorobenzaldehyde in 1.5 l. of 95% ethanol was added in one portion to a stirred solution of 123 g. of sodium cyanide, 515 g. of ammonium carbonate and 1.5 l. of water. The mixture was stirred at 50° for 120 hours. The cooled reaction mixture was acidified to pH 2 with concentrated hydrochloric acid and stirred one hour. The hydantoin was collected by filtration, washed with cold water, and sucked dry on the filter.

A mixture of the crude hydantoin obtained from two runs and 4 l. of 10% sodium hydroxide was refluxed for 18 hours. The solution was carbon treated and neutralized to pH 7 with acetic acid. The solid was collected by filtration, washed with water, and dried on the filter. A suspension of the product in 4 l. of water was acidified to pH 2 with concentrated hydrochloric acid. After stirring for 1.5 hours the insoluble material was removed by filtration and the filtrate adjusted to pH 7 with 10% sodium hydroxide. The precipitate was collected by filtration and dried in vacuo at 75° for 18 hours giving 311 g. of DL-α-amino-3-chlorophenylacetic acid; M.P. 266–269° dec.

DL-α-formamido-3-chlorophenylacetic acid.—To 100 g. of DL-α-amino-3-chlorophenylacetic acid was added 1.33 l. of formic acid. The reaction mixture was warmed to 50° and 483 ml. of acetic anhydride was added dropwise. After storage overnight the DL-α-formamido-3-chlorophenylacetic acid was collected by filtration and washed with water; yield 97 g.

D-(−)-α-amino-3-chlorophenylacetic acid.—α - Formamido-3-chlorophenylacetic acid (721 g.) and one kg. of dehydroabietylamine were combined in 4.1 of methanol. After storing in the cold for two hours the crystalline salt was collected by filtration. The product was recrystallized from methanol-water; yield 598 g., $[\alpha]_D^{25°}$ −225° (c.=0.4, methanol). The salt was slurried in 2 l. of methanol and 2 liters of saturated sodium bicarbonate solution. The mixture was diluted with 2 l. of water, layered with methyl isobutyl ketone, and stirred vigorously. The aqueous phase was separated and acidified to pH 2 with conc. hydrochloric acid. The acid was collected by filtration and dried. The dried product was combined with 2 l. of 6 N hydrochloric acid and 750 ml. of methanol, the mixture heated for two hours, and filtered. The solution was adjusted to pH 5 with ammonium hydroxide. The solid was collected by filtration and washed with water and acetone giving 112 g. of D-(−)-α-amino-3-chlorophenylacetic acid; $[\alpha]_D^{23°}$ −125° (c.=0.4, 1 N HCl).

D-(−)-α-amino-3-chlorophenylacetyl chloride hydrochloride.—To a stirred suspension of 25 g. of D-(−)-α-amino-3-chlorophenylacetic acid in 375 ml. of methylene chloride at 2° was added 36.5 g. of phosphorus pentachloride. After stirring at 0 to 2° for one and one-half hours the product D-(−)-α-amino-3-chlorophenylacetyl chloride hydrochloride was collected by filtration, washed with methylene chloride and "Skellysolve B," and dried in vacuo to constant weight; yield 17.0 g.

DL-α-amino-3-fluorophenylacetic acid.—To a stirred solution of 24.5 g. of sodium cyanide, 29.5 g. of ammonium chloride, 25 ml. of ammonium hydroxide and 100 ml. of water at room temperature was added a solution of 62.0 g. of m-fluorobenzaldehyde in 200 ml. of methanol. The mixture was stirred at 38° for two hours. The methanol was stripped off at reduced pressure. The residue was extracted with two by 200-ml. portions of ethyl acetate. The combined extracts were washed with water. To the ethyl acetate phase was added dropwise with vigorous stirring 50 ml. of 6 N hydrochloric acid at room temperature. The solution was put under vacuum (water aspirator) and 250 ml. of 6 N hydrochloric acid added dropwise. The mixture was refluxed for 2.5 hours, stirred for 13 hours, and adjusted to pH 4.8 with concentrated ammonium hydroxide while cooling in an ice bath. The aqueous phase was decanted and the gummy precipitate triturated with water and ethyl acetate. The product DL-α-amino-3-fluorophenylacetic acid was collected by filtration and dried in vacuo over phosphorus pentoxide; yield 8.6 g., M.P. 200–203° (sublimation). A second crop of product separated from the filtrates; yield 2.0 g., M.P. 245–250° (sublimation).

DL - α - formamido - 3 - fluorophenylacetic acid.—A partial solution of 35 g. of DL-α-amino-3-fluorophenylacetic acid in 356 ml. of 88% formic acid was heated to 50° and 119 ml. of acetic anhydride added dropwise. The mixture was stirred for 17 hours at 50–60° and cooled. The product, DL-α-formamido - 3 - fluorophenylacetic acid, was collected by filtration and dried in vacuo; yield 38.5 g., M.P. 207–209° dec.

D - α - formamido - 3 - fluorophenylacetic acid.—To a solution of 20 g. of DL-α-formamide - 3 - fluorophenylacetic acid in 4 l. of pH 7 phosphate buffer was added 3.0 g. of hog kidney D-amino acid oxidase (Nutritional Biochemicals Corp.). The mixture was stored at 37° for 19.5 hours, adjusted to pH 5.0 with acetic acid, 5 g. of carbon added, heated to 60° for one-half hour and filtered. The filtrate was adjusted to pH 2 with 40% phosphoric acid and extracted with ethyl acetate. The ethyl acetate extract was washed with water and stripped to dryness giving 10.0 g. of product; M.P. 190–192°, $[\alpha]_D^{24°}$ −161.0° (c.=1.0 methanol). The product was again treated with hog kidney D-amino acid oxidase (1 g.) in 500 ml. of pH 7 phosphate buffer and the product worked up as above. There was obtained after recrystallization of the product from methanol 5.7 g. of D-α-formamido - 3 - fluorophenylacetic acid; $[\alpha]_D^{24°}$ −178.0° (c.=1.0, methanol).

D-α-amino - 3 - fluorophenylacetic acid.—A suspension of D - α - formamido - 3 - fluorophenylacetic acid (9.48 g.) in 100 ml. of 6 N hydrochloric acid was refluxed for one-half hour. The reaction mixture was cooled in an ice bath, filtered, and adjusted to pH 3.8 with concentrated ammonium hydroxide. After stirring for 10 minutes the product, D-α-amino - 3 - fluorophenylacetic acid, was collected by filtration and dried in vacuo over phosphorus pentoxide; yield 6.63 g., $[\alpha]_D^{24}$ −110° (c.=1.0, 1 N hydrochloric acid), M.P. 249–250°.

Additional information is given concerning the synthesis of ring-substituted 2-phenylglycines by Doyle et al., J. Chem. Soc., 1440 (1962) and Ryan et al., J. Med. Chem., 12,310–313 (1969). As stated by Ryan et al. such amino acids are converted into N-t-butoxycarbonyl derivatives by the method of Schwyzer et al., Helv. Chim. Acta. 42, 2622 (1959); Ryan et al. also give an illustrative example of the resolution of such a derivative by the use of cinchonine.

(B) Ring-substituted ampicillins

α - Aminobenzylpenicillins and α - aminothenylpenicillins are known, as from U.S. Pats. 2,985,648, 3,140,282, 3,373,156, 3,308,023 and 3,342,677 and British Pats. 903,-785, 918,169, 978,178, 991,586 and 1,033,257.

Ring-substituted α - aminobenzylpenicillins have also been reported by Ekstrom et al., Acta Chemica Scandinavica 19 (2), 281–299 (1965) and in U.S. Pats. 3,316,-247 and 3,385,847 and can also be made by standard methods from the 2 - phenylglycines reported by A. H. Neims et al., Biochemistry (Wash.) 5 (1), 203–213 January 1966) and by P. Friis et al., Acta Chemica Scandinavica 17 (9), 2391–2396 (1963) and from 2-phenylglycines by the procedures illustrated below.

D - α - (carbobenzoxyamino) - 3 - fluorophenylacetic acid.—To D - α - amino - 3 - fluorophenylacetic acid (4.9 g.) partially dissolved in 300 ml. of water at pH 10 (10% sodium hydroxide used) at 0° was added 11.2 of carbobenzoxy chloride. The vigorously stirred mixture was maintained at pH 10 by the addition of 10% sodium hydroxide. A white gum formed. After one hour the reaction mixture was extracted once with ether. The aqueous phase was layered with ethyl acetate and acidified to pH 3 with 6 N hydrochloric acid. Three additional extractions with ethyl acetate were made. The combined ethyl acetate extracts were washed with water, dried with magnesium sulfate, the solvent stripped off at reduced pressure, the resulting residual oil solidified with "Skellysolve B," collected by filtration, and dried in vacuo over phosphorus pentoxide; yield 4.3 g. of D - α - (carbobenzoxyamino) - 3 - fluorophenylacetic acid, M.P. 117–119°, $[\alpha]_D^{24°}$ = −80° (c.=1.0, methanol).

6 - (D - α - amino - 3 - fluorophenylacetamido)penicillanic acid.—Ethyl chloroformate (1.53 g.) was added to a solution of 4.2 g. of D - α - (carbobenzoxyamino)-3-fluorophenylacetic acid and 1.94 ml. of triethylamine in 70 ml. of tetrahydrofuran at −5°. After stirring for 10 minutes a solution of 3.03 g. of 6-aminopenicillanic acid and 1.94 ml. of triethylamine in 70 ml. of 50% aqueous tetrahydrofuran was added all at once. The mixture was stirred for one-half hour at 0° and then the ice bath was removed for one hour. The reaction mixture was diluted with 250 ml. of water and the tetrahydrofuran distilled off at reduced pressure. To the residue was added 350 ml. of ethyl acetate and 7 ml. of 42% phosphoric acid. Two additional extractions with 250 ml. portions of ethyl acetate were made. The combined ethyl acetate extracts were washed with water, dried with magnesium sulfate, and the solvent distilled off at reduced pressure. The residue was solidified with "Skellysolve B," collected by filtration, and dried in vacuo over phosphorus pentoxide giving 4.8 g. of 6 - [D - α - (carbobenzoxyamino)-3-fluorophenylacetamido]-penicillanic acid.

The carbobenzoxy penicillin was dissolved in 50 ml. of 3% sodium bicarbonate plus 50 ml. of dioxane and hydrogenated in the presence of 4.8 g. of 30% palladium on diatomaceous earth for 25 minutes on a low pressure Paar hydrogenation apparatus. Phosphoric acid (42%) was added to the hydrogenation mixture to coagulate the catalyst. The mixture was filtered, methyl isobutyl ketone was added to the filtrate, and the mixture again filtered, removing all catalyst. The aqueous phase was separated, adjusted to pH 4.5 with 10% sodium hydroxide, and the dioxane distilled off at reduced pressure. The concentrate was readjusted to pH 4.5, 2-propanol added, and concentrated giving a gelatinous precipitate which was collected by filtration and washed with ether. The crude product was stirred with 5 ml. of water for 30 minutes, collected by filtration, and dried in vacuo over phosphorus pentoxide; yield 700 mg. The infrared and nuclear magnetic resonance spectra were consistent with 6-(D-α-amino - 3 - fluorophenylacetamido)penicillanic acid.

6 - [D-α-amino-3-chlorophenylacetamido]penicillanic acid β-naphthalenesulfonate.—A suspension of 32.4 g. (0.150 mole) of 6-aminopenicillanic acid in 320 ml. of water was adjusted to pH 6.5 with 20% sodium hydroxide. The resulting clear solution was diluted with 1280 ml. of tetrahydrofuran and then adjusted to pH 3.5 with 6 N hydrochloric acid. The rapidly stirred mixture was cooled to −40° and 17.0 g. (0.0708 mole) of D-(−)-α-amino-3-chlorophenylacetyl chloride hydrochloride was added in one portion. The cooling bath was removed and the temperature of the reaction mixture brought to 0° during 40 minutes. The mixture was adjusted to pH 4.5 and the solid removed by filtration, the filter cake being washed with 300 ml. of water. The filtrate was adjusted to pH 7.0 with 20% sodium hydroxide and the tetrahydrofuran removed at reduced pressure on a rotary flash evaporator. The aqueous concentrate was filtered. The filtrate was adjusted to pH 2 with 6 N hydrochloric acid and extracted twice with methyl isobutyl ketone. The aqueous phase was adjusted to pH 4.5 with triethylamine, layered with 150 ml. of methyl isobutyl ketone and treated with 37.2 ml. of a 43% aqueous solution of β-naphthylenesulfonic acid. After stirring at 0 to 2° for two hours the crystalline product, 6 - [D-α-amino-3-chlorophenylacetamido]penicillanic acid. β-naphthalenesulfonate was collected by filtration, washed with water, and air dried; yield 11.2 g., M.P. 190–200° dec. with prior softening and darkening above about 175°. The infrared spectrum was consistent with 6-[D-α-amino-3-chlorophenylacetamido]penicillanic acid β-naphthalenesulfonate.

6 - [D-α-amino-3-chlorophenylacetamido]penicillanic acid.—A suspension of 27.3 g. of 6-[D-α-amino-3-chlorophenylacetamido]penicillanic acid β-naphthylenesulfonate in 500 ml. of water was adjusted to pH 7.5 with triethylamine and stirred for one hour. The mixture was then slowly adjusted to pH 4.5 with 6 N hydrochloric acid and stirred for two hours at 0°. The crystalline product was collected by filtration, washed with water, air dried, and then dried in vacuo over phosphorus pentoxide; yield 12.3 g. A suspension of the product (12 g.) in one l. of water was adjusted to pH 1.5–1.6 with 6 N hydrochloric acid. The mixture was filtered twice through diatomaceous earth ("Super Cel") to remove insoluble material. The clear filtrate was adjusted to pH 4.3 with 20% sodium hydroxide and stirred at 2° for two hours. The crystalline 6-[D-α-amino-3-chlorophenylacetamido]penicillanic acid was collected by filtration, washed with a small amount of water and dried in vacuo over phosphorus pentoxide; yield 7.0 g., M.P. 203–204° dec., with prior darkening, $[\alpha]_D^{23°}=261.9°$ (c=0.5, 0.1 N HCl).

*Analysis.*—Calc'd for $C_{16}H_{18}ClN_3O_4S$ (percent): C, 50.06; H, 4.73; N, 10.92. Found (percent): C, 50.00; H, 4.76; N, 10.5.

This compound is also named 6-[R-α-amino-3-chlorophenylacetamido]penicillanic acid in the nomenclature of Cahn, Ingold and Prelog, Experientia, XII (3), 81–94 (Mar. 15, 1956); all of the D penicillins in this specification are R penicillins in the system of Cahn et al.

Sodium D-(−)-N (2 - hydroxy - 1-napthylmethylene) 2 - amino - 2 - (3,5-dichloro-4-hydroxyphenyl)-acetate.—To a stirred solution of (0.04 mole) of D-(−)-2-(3,5-dichloro - 4 - hydroxyphenyl)-glycine 25 ml. H₂O, 10 ml. ethanol, and 1.6 g. (0.04 mole) of sodium hydroxide is added, all at once, a warm solution of 7.57 g. (0.044 mole) of 2-hydroxy-1-naphthaldehyde (Aldrich Chemical Company) in 40 ml. of 95% ethanol. The mixture is heated until an initial precipitate redissolves and then is rapidly cooled to about 5° C. and scratched. After cooling one hour in the ice bath the crystalline product is filtered off and air dried. The infrared and NMR spectra are entirely consistent with the desired structure.

6 - [D-2,2-dimethyl-4-(3,5-dichloro-4-hydroxyphenyl)-5 - oxo - 1-imidazolidinyl]penicillanic acid.—To a stirred and cooled (−10° C.) suspension of (0.01 mole) of sodium D-(−)-N-(2 - hydroxy-1-napthylmethylene)-α-amino-α-(3,5 - dichloro - 4 - hydroxyphenyl) acetate in 100 ml. of acetone, 5 ml. of p-dioxane and 3 drops of pyridine is added 1.08 g. (0.01 mole) of ethyl chloroformate (EKC). The mixture is stirred at −10° C. for 30 minutes and then cooled to −40° C. and filtered to remove the sodium chloride which precipitated. To this filtrate of the mixed anhydride, vigorously stirred at −15° C. is added, all at once, a precooled (0° C.) solution of 2.16 g. (0.01 mole) of 6-aminopenicillanic acid, 1.68 g. (0.02 mole) of NaHCO₃ in 50 ml. of water. There is vigorous CO₂ evolution for about 5 minutes. The temperature is kept at or below −10° C. for 20 minutes and then allowed to come to room temperature (22° C.) over a 30 minute period. To this solution is added 50 ml. of water and the acetone removed under pressure at 20° C. Two ml. ether extracts are taken and discarded. The aqueous layer is then adjusted to pH 2 with 6 N HCl with sufficient acetone added to keep everything in solution. This solution is allowed to stand 30 minutes at 22° C. and then two 300 ml. ether extracts are taken and discarded. The pH is readjusted to 4.7 with 20% NaOH and concentrated under reduced pressure to a volume of 25 ml. at 20° C. A small amount of insoluble material is filtered off and 25 ml. acetone added to the filtrate. The pH is then adjusted to 8.8 with 20% NaOH and the resulting solution let stand at 10° C. for 5 hours. The pH is adjusted to 3 with 40% H₃PO₄ and two 100 ml. ethyl acetate extracts taken. The combined ethyl acetate extracts are washed once with 20 ml. H₂O and then filtered and concentrated under reduced pressure at 15° C. to a volume of about 20 ml. The crystalline product is filtered off and slurried in 10 ml. of acetone-water (1:1 by volume) for 10 minutes and filtered again.

The product obtained is 6 - [D-2,2-dimethyl-4-(3,5-dichloro - 4 - hydroxyphenyl - 5-oxo-1-imidazolidinyl] penicillanic acid and has IR and NMR spectra entirely consistent with the proposed structure.

6 - [D-α-amino-α-(3,5-dichloro-4-hydroxyphenyl)-acetamido]penicillanic acid.—To a stirred suspension of 600 mg. of 6-[D-2,2-dimethyl-4-(3,5-dimethyl - 4 - hydroxyphenyl)-5-oxo-1-imidazolidinyl]-pencillanic acid in 5 ml. of water is added 20% sodium hydroxide solution until pH 7 is obtained. The pH is maintained at about 7 with occasional addition of 1 N HCl for four hours and then the pH is adjusted to 4.5 with 1 N HCl and maintained at pH 4.5 for another hour. The crystalline precipitate that forms is separated by filtration, washed with water and dried in vacuo over P₂O₅, yielding the product 6-[D-α-amino-α-(3,5-dichloro - 4 - hydroxyphenyl)-acetamido]

penicillanic acid. The infrared spectrum is consistent with the proposed structure.

Sodium D-(—)-N-(2-hydroxy-1-naphthylmethylene)-α-amino-α-(3-chloro-4-hydroxyphenyl) acetate.—To a stirred solution of 8 g. (0.04 mole) of D-(—)-2-(3-chloro-4-hydroxyphenyl)-glycine, 25 ml. H₂O, 10 ml. ethanol, and 1.6 g. (0.04 mole) of sodium hydroxide was added, all at once, a warm solution of 7.57 g. (0.044 mole) of 2-hydroxyl-1-naphthaldehyde (Aldrich Chemical Company in 40 ml. of 95% ethanol. The mixture was heated until an initial precipitate redissolved and then is rapidly cooled to about 5° C. and scratched. After cooling one hour in the ice bath the crystalline product is filtered off and air dried. The infrared and NMR spectra are entirely consistent with the desired structure.

6 - [D-2,2-dimethyl-4-(3,5-dichloro-4-hydroxyphenyl)-5-oxo-1-imidazolidinyl]penicillanic acid.—To a stirred and cooled (—10° C.) suspension of (0.01 mole) of sodium D-(—) - N - (2-hydroxy-1-naphthylmethylene)-α-amino-α-(3,5-dichloro-4-hydroxyphenyl) acetate in 100 ml. of acetone, 5 ml. of p-dioxane and 3 drops of pyridine is added 1.08 g. (0.01 mole) of ethyl chloroformate (EKC). The mixture is stirred at —10° C. for 30 minutes and then cooled to —40° C. and filtered to remove the sodium chloride which precipitated. To this filtrate of the mixed anhydride, vigorously stirred at —15° C. is added, all at once, a precooled (0° C.) solution of 2.16 g. (0.01 mole) of 6-aminopenicillanic acid, 1.68 g. (0.02 mole) of NaHCO₃ in 50 ml. of water. There is vigorous CO₂ evolution for about 5 minutes. The temperature is kept at or below —10° C. for 20 minutes and then allowed to come to room temperature (22° C.) over a 30 minute period. To this solution is added 50 ml. of water and the acetone removed under pressure at 20° C. Two ml. ether extracts are taken and discarded. The aqueous layer is then adjusted to pH 2 with 6 N HCl with sufficient acetone added to keep everything in solution. This solution is allowed to stand 30 minutes at 22° C. and then two 300 ml. ether extracts are taken and discarded. The pH is readjusted to 4.7 with 20% NaOH and concentrated under reduced pressure to a volume of 25 ml. at 20° C. A small amount of insoluble material is filtered off and 25 ml. acetone added to the filtrate. The pH is then adjusted to 8.8 with 20% NaOH and the resulting solution let stand at 10° C. for 5 hours. The pH is adjusted to 3 with 40% H₃PO and two 100 ml. ethyl acetate extracts taken. The combined ethyl acetate extracts are washed once with 20 ml. H₂O and then filtered and concentrated under reduced pressure at 15° C. to a volume of about 20 ml. The crystalline product is filtered off and slurried in 10 ml. of acetone-water (1:1 by volume) for 10 minutes and filtered again.

The product obtained is 6-[D-2,2-dimethyl-4-(3,5-dichloro-4-hydroxyphenyl) 5-oxo-1-imidazolidinyl]-penicillanic acid and has IR and NMR spectra entirely consistent with the proposed structure.

6 - [D-α-amino-α-(3,5-dichloro-4-hydroxyphenyl)-acetamido]penicillanic acid.—To a stirred suspension of 600 mg. of 6 - [D-2,2-dimethyl-4-(3,5-dichloro-4-hydroxyphenyl)-5-oxo-1-imidazolidinyl]-penicillanic acid in 5 ml. of water is added 20% sodium hydroxide solution until pH 7 is obtained. The pH is maintained at about 7 with occasional addition of 1 N HCl for four hours and then the pH is adjusted to 4.5 with 1 N HCl and maintained at pH 4.5 for another hour. The crystalline precipitate that forms is separated by filtration, washed with water and dried in vacuo over P₂O₅, yielding the product 6-[D-α-amino - α - (3,5-dichloro-4-hydroxyphenyl) acetamido]-penicillanic acid. The infrared spectrum is consistent with the proposed structure.

(C) Preparation of 5-chloro-3-substituted-1,2,4-oxadiazoles

In the preparation of 5 - chloro-3-substituted-1,2,4-oxadiazoles the universal and most useful starting material is an aromatic or aliphatic nitrile as illustrated by the preceding examples. These are well-known compounds which are prepared, for example, by the methods outlined in classic textbooks such as Organic Preparations by Conard Weygand, Interscience Publishers, Inc., New York (1945) on pages 115, 255 and 367 and The Chemistry of the Carbon Compounds by Victor Van Richter edited by Richard Anschutz, Third English Edition, Elsevier Publishing Co., Inc., New York, N.Y. (1946) in volume III at pages 304–306 and in volume I at pages 325–327 and Laboratory Methods of Organic Chemistry by L. Gattermann revised by H. Wieland, translated from the twenty-fourth edition, Macmillan and Co., Limited, London (1943) at pages 137–138 and by the following procedure:

2-furamide (11.1 g., 0.1 mole, Eastman Kodak Co.) and phosphorus pentoxide (21 g., 0.15 mole) were mixed in and heated with a Meeker burner (gently at first and then more strongly) until 2-cyanofuran distilled at 130°–140° C., 5.6 g.

Such amides are prepared by published methods as illustrated in the following table in which it is to be understood that acids are converted to acid chlorides by treatment with thionyl chloride and acid chlorides are converted to amides by reaction with ammonia:

| Amide | Illustrative sources |
|---|---|
| thiazole-CONH₂ (S,N) | Acid, acid chloride, amide: Looker, Wilson, J. Heterocyclic Chem. 2 (4), 348 (1965). Acid, acid chloride, ethyl ester: Hurd, Mori, J. Am. Chem. Soc. 77, 5362 (1955). |
| thiazole-CONH₂ (N,S) | Acid, ethyl ester, amide: U.S. 3,060,187. |
| CH₃-oxazole-CONH₂-CH₃ | Acid, ethyl ester: Beil. 27, 317, Amide: C.A. 58: 3409. Kochetkov, Sokolov, Luboshnikova, Zh. Obshch. Khim. 32, 1778-85 (1962). |
| oxazole-CONH₂ | Quilico, Panizzi, Gazz. Chim. Ital. 72, 458 (1942). Quilico, Stagno d'Alcontres, Gazz. Chim Ital. 79, 654 (1949). Mina, Rateb, Soliman, J. Chem. Soc. 1962, 4234. |
| pyridine-CONH₂ | Amide: commercially available. |
| CH₃-oxazole-CONH₂ | Amide, acid: Beil. 27, 707. Acid chloride: readily prepared by known methods. |
| phenyl-oxazole-CONH₂-CH₃ | Acid, acid chloride: Doyle and Nayler, U.S. 2,996,501 and references cited therein. |
| H₃C-oxazole-CONH₂-phenyl | Acid, acid chloride: Doyle and Nayler, U.S. 2,996,501 and references cited therein. |

Aromatic and aliphatic nitriles are converted to amide oximes by the procedures described by Beilstein, 9, 304, II 214 and references therein and by Eloy, Lenaers, Chem. Rev. 62, 155 (1962) thus:

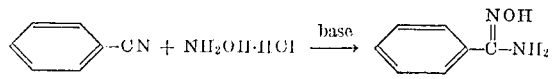

Such amide oximes are converted to 5-hydroxy-3-substituted-1,2,4-oxadiazoles by the process described in Beilstein, 27, 644, II 698 and references therein as follows:

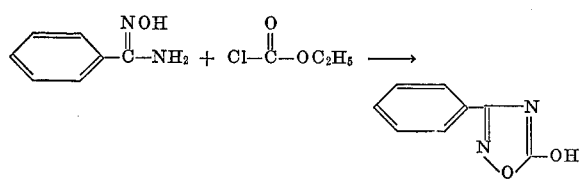

and also by the procedure of Moussebois and Eloy, Helv. Chim. Acta, 47, 838 (1964) thus:

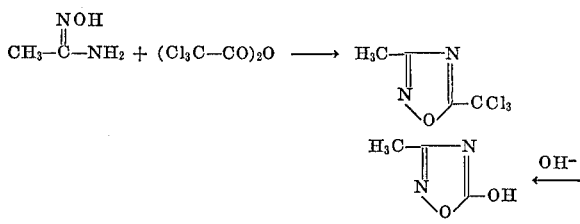

An alternate route to the reagents needed in the procedure of Moussebois et al. is provided by Chemical Abstracts, 65, 15391 g. and U.S. Pat. 3,264,318 as follows:

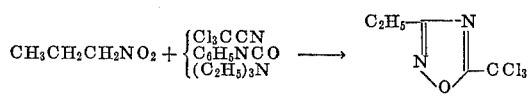

These 5-hydroxy-3-substituted-1,2,4-oxadiazoles are then converted to the desired 5-chloro-3-substituted-1,2,4-oxadiazoles by the general method reported in Chemical Abstracts 65, P 732f (Japan Patent 4985 of 1966) thus:

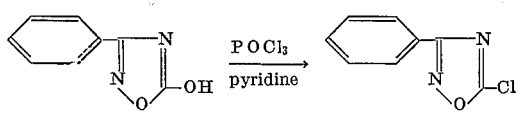

An alternate preparation of 5-chloro-3-substituted-1,2,4-oxadiazoles utilizes the procedure of Moussebois and Eloy, Helv. Chim. Acta, 47, 838 (1964) thus:

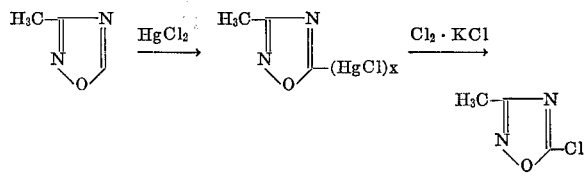

the required reagent is prepared by the procedures of Ainsworth et al., J. Med. Chem. 10, 208 (1967) and U.S. Pat. 3,279,988 thus:

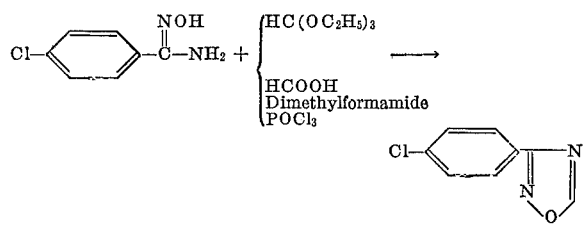

Additional, illustrative preparations of such reagents are as follows:

| Intermediate | Reference |
|---|---|
| 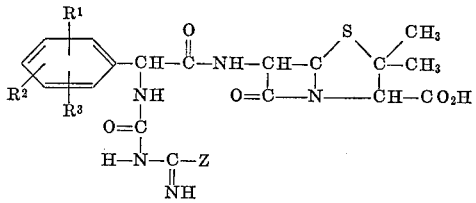 | C.A. 65, P 732. |
| | Berichte, 22, 2418 (1889). |
| | C.A. 62, P 5283b; |

I claim:
1. The compounds of the formulae

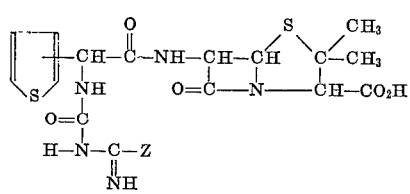

and

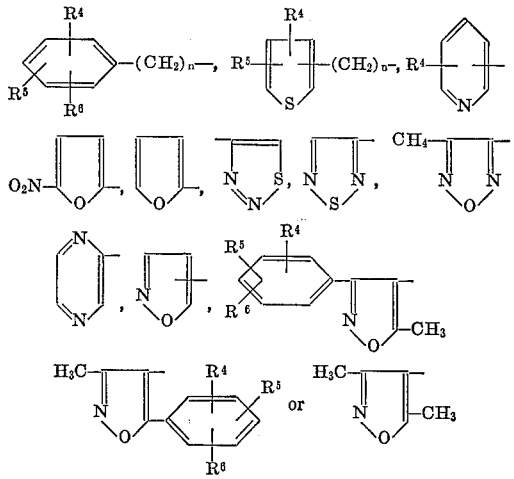

wherein $R^1$, $R^2$ and $R^3$ each is hydrogen, nitro, (lower)-alkylamino, di(lower)alkylamino, (lower)alkanoylamino, amino, hydroxy, (lower)alkanoyloxy, (lower)alkyl, (lower)alkoxy, sulfamyl, chloro, iodo, bromo, fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms, wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl, (lower)alkoxy, sulfamyl, chloro, iodo, bromo, fluoro or trifluoromethyl; and their nontoxic pharmaceutically acceptable salts.

2. The compounds of claim 1 having the D(—) configuration.

3. The compounds of claim 2 wherein $R^1$, $R^2$ and $R^3$ are each hydrogen, hydroxy or amino.

4. The compounds of claim 2 wherein $R^1$, $R^2$ and $R^3$ are each hydrogen.

5. The compounds of claim 2 wherein $R^1$, $R^2$, $R^3$ and, when present, $R^4$, $R^5$ and $R^6$ are each hydrogen.

6. The compounds of claim 2 wherein $R^1$, $R^2$ and $R^3$ are each hydrogen, hydroxy or amino and Z is (lower)alkyl, chloromethyl, dichloromethyl, trichloromethyl or (lower)alkenyl.

7. The compounds of claim 2 wherein $R^1$, $R^2$ and $R^3$ are each hydrogen and Z is (lower)alkyl.

8. The compounds of claim 2 wherein $R^1$, $R^2$, $R^3$ and, when present, $R^4$, $R^5$, and $R^6$ are each hydrogen, $n$ is zero and Z is one of the specified aromatic radicals.

9. The compounds of claim 2 wherein $R^1$, $R^2$ and $R^3$ are each hydrogen, hydroxy or amino and Z is

[structures]

10. The compounds of claim 2 wherein $R^1$, $R^2$ and $R^3$ are each hydrogen and Z is phenyl, 2-thienyl, 3-thienyl, 2-furyl or methyl.

11. The compound of claim 1 known as 6-[D-α-(3-benzimidoyl - ureido)phenylacetamido]penicillanic acid and its nontoxic, pharmaceutically acceptable salts.

12. The compound of claim 1 known as 6-{D-α-[3-(2'-furimidoyl)-ureido]phenylacetamido}penicillanic acid and its nontoxic, pharmaceutically acceptable salts.

13. The compound of claim 1 known as 6-{D-α-[3-(3'-thienimidoyl) - ureido]phenylacetamido}penicillanic acid and its nontoxic, pharmaceutically acceptable salts.

14. The compound of claim 1 known as 6-{D-α-[3 - (3'-thienimidoyl)ureido]phenylacetamido}penicillanic acid and its nontoxic, pharmaceutically acceptable salts.

15. The compound of claim 1 known as 6-[D-α-(3-acetimidoyl-ureido)phenylacetamido]penicillanic acid and its nontoxic pharmaceutically acceptable salts.

16. The compound of claim 1 known as 6-[D-α-(3-benzimidoylureido)-2-thienylacetamido]penicillanic acid and its nontoxic, pharmaceutically acceptable salts.

17. The compound of claim 1 known as 6-{D-α-[3-(2'-furimidoyl)ureido]-2-thienylacetamido}penicillanic acid and its nontoxic, pharmaceutically acceptable salts.

18. The compound of claim 1 known as 6-{D-α-[3-(2'-thienimidoyl)ureido]-2-thienylacetamido}penicillanic acid and its nontoxic, pharmaceutically acceptable salts.

19. The compound of claim 1 known as 6-D-α-[3-(3'-thienimidoyl)ureido]-2-thienylacetamido penicillanic acid and its nontoxic, pharmaceutically acceptable salts.

20. The compound of claim 1 known as 6-[D-α-(3-acetimidoylureido)-2-thienylacetamido]penicillanic acid and its nontoxic, pharmaceutically acceptable salts.

21. The compound of claim 1 known as 6-[D-α-(3-benzimidoylureido)-3-thienylacetamido]penicillanic acid and its nontoxic, pharmaceutically acceptable salts.

22. The compound of claim 1 known as 6-{D-α-[3-(2'-furimidoyl)ureido]-3-thienylacetamido}penicillanic acid and its nontoxic, pharmaceutically acceptable salts.

23. The compound of claim 1 known as 6-{D-α-[3-(2'-thienimidoyl)ureido] - 3 - thienylacetamido}penicillanic acid and its nontoxic, pharmaceutically acceptable salts.

24. The compound of claim 1 as 6-{D-α-[3-(3'-thienimidoyl)ureido]-3-thienylacetamido}penicillanic acid and its nontoxic, pharmaceutically acceptable salts.

25. The compound of claim 1 known as 6-[D-α-(3-acetimidoylureido)-3-thienylacetamido]penicillanic acid and its nontoxic, pharmaceutically acceptable salts.

26. 6 - [D-α-(3-benzimidoylureido)phenylacetamido]-penicillanic acid.

27. 6 - {D - α-[3-(2'-furimidoyl)-ureido]phenylacetamido}penicillanic acid.

28. 6 - {D - α - [3 - (3'-thienimidoyl)ureido]phenylacetamido}penicillanic acid.

29. 6 - [D - α-(3-acetimidoylureido)phenylacetamido]penicillanic acid.

30. The sodium salt of the compound of claim 26.

31. The potassium salt of the compound of claim 26.

32. The compounds of the formulae

[structures]

and

[structures]

wherein $R^1$, $R^2$ and $R^3$ each is hydrogen, nitro, (lower)alkylamino, di(lower)alkylamino, (lower)alkanoylamino, amino, hydroxy, (lower)alkanoyloxy, (lower)alkyl, (lower)alkoxy, sulfamyl, chloro, iodo, bromo, fluoro or trifluoromethyl; Z is (lower) alkyl, cycloalkyl having 4, 5, 6 or 7 carbon atoms, monohalo(lower)alkyl, dichloromethyl, trichloromethyl, (lower)alkenyl of 2 to 6 carbon atoms,

[structures]

where $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl, (lower)alkoxy, sulfamyl, chloro, iodo, bromo, fluoro or trifluoromethyl; and their nontoxic pharmaceutically acceptable salts.

33. The compounds of claim 32 having the D(—) configuration.

34. The compounds of claim 33 wherein $R^1$, $R^2$ and $R^3$ are each hydrogen, hydroxy or amino.

35. The compounds of claim 33 wherein $R^1$, $R^2$ and $R^3$ are each hydrogen.

36. The compounds of claim 33 wherein $R^1$, $R^2$, $R^3$ and, when present, $R^4$, $R^5$ and $R^6$ are each hydrogen.

37. The compounds of claim 33 wherein $R^1$, $R^2$ and $R^3$ are each hydrogen, hydroxy or amino and Z is (lower)alkyl, chloromethyl, dichloromethyl, trichloromethyl or (lower)alkenyl.

38. The compounds of claim 33 wherein $R^1$, $R^2$ and $R^3$ are each hydrogen and Z is (lower)alkyl.

39. The compounds of claim 33 wherein $R^1$, $R^2$, $R^3$ and, when present, $R^4$, $R^5$ and $R^6$ are each hydrogen, $n$ is zero and Z is one of the specified aromatic radicals.

40. The compounds of claim 33 wherein $R^1$, $R^2$ and $R^3$ are each hydrogen, hydroxy or amino and Z is

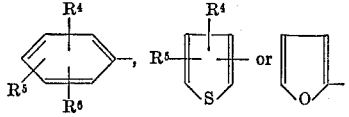

41. The compounds of claim 33 wherein $R^1$, $R^2$ and $R^3$ are each hydrogen and Z is phenyl, 2-thienyl, 3-thienyl, 2-furyl or methyl.

42. The compound of claim 32 known as 6-[D-α-(3-phenyl - 1,2,4 - oxadiazol - 5 - yl - amino)phenylacetamido]penicillanic acid and its nontoxic, pharmaceutically acceptable salts.

43. The compound of claim 32 known as 6-{D-α-[3-(2' - thienyl) - 1,2,4 - oxadiazol - 5 - yl - amino]phenylacetamido}penicillanic acid and its nontoxic, pharmaceutically acceptable salts.

44. The compound of claim 32 known as 6-{D-α-[3-(2'-furyl)-1,2,4-oxadiazol - 5-yl-amino]phenylacetamido} penicillanic acid and its nontoxic, pharmaceutically acceptable salts.

45. The compound of claim 32 known as 6-[D-α-(3-methyl - 1,2,4 - oxadiazol - 5-yl-amino)phenylacetamido] penicillanic acid and its nontoxic, pharmaceutically acceptable salts.

References Cited
UNITED STATES PATENTS 3,479,339  11/1969  Holdrege _____ 260—239.1
3,481,922  12/1969  Holdrege _____ 260—239.1

NICHOLAS S. RIZZO, Primary Examiner

U.S. Cl. X.R.

424—271